US008311398B2

(12) United States Patent
Maeda et al.

(10) Patent No.: US 8,311,398 B2
(45) Date of Patent: Nov. 13, 2012

(54) DATA RECORDING DEVICE, DATA RECORDING METHOD, AND COMPUTER PROGRAM

(75) Inventors: Tetsuhiro Maeda, Kanagawa (JP); Kenichiro Aridome, Kanagawa (JP); Yukio Isobe, Kanagawa (JP); Naoki Morimoto, Tokyo (JP); Atsushi Mae, Kanagawa (JP)

(73) Assignee: Sony Corporation, Tokyo (JP)

( * ) Notice: Subject to any disclaimer, the term of this patent is extended or adjusted under 35 U.S.C. 154(b) by 1044 days.

(21) Appl. No.: 11/995,014

(22) PCT Filed: Apr. 16, 2007

(86) PCT No.: PCT/JP2007/058296
§ 371 (c)(1),
(2), (4) Date: Jan. 8, 2008

(87) PCT Pub. No.: WO2007/129531
PCT Pub. Date: Nov. 15, 2007

(65) Prior Publication Data
US 2010/0129066 A1    May 27, 2010

(30) Foreign Application Priority Data
May 8, 2006  (JP) .................................. 2006-129350

(51) Int. Cl.
*H04N 9/80* (2006.01)
(52) U.S. Cl. .................. 386/334; 386/248; 386/E9.013; 711/113
(58) Field of Classification Search .................. 386/126, 386/248, E9.013; 711/113
See application file for complete search history.

(56) References Cited

U.S. PATENT DOCUMENTS

| 2003/0177138 A1 | 9/2003 | Aridome et al. |
| 2005/0071551 A1* | 3/2005 | Miyamoto ..................... 711/113 |
| 2005/0094975 A1 | 5/2005 | Kikuchi et al. |
| 2006/0262710 A1* | 11/2006 | Shim et al. ................. 369/275.1 |

FOREIGN PATENT DOCUMENTS

| EP | 1 130 599 A2 | 9/2001 |
| EP | 1 280 058 A2 | 1/2003 |
| EP | 1 416 489 A1 | 5/2004 |
| EP | 1 531 477 A1 | 5/2005 |
| JP | 11 232792 | 8/1999 |

(Continued)

OTHER PUBLICATIONS

Aoyama (2005). Machine Translation of JP2005243120.*

(Continued)

*Primary Examiner* — Ashok Patel
*Assistant Examiner* — Brian Shaw
(74) *Attorney, Agent, or Firm* — Oblon, Spivak, McClelland, Maier & Neustadt, L.L.P.

(57) ABSTRACT

A method for initializing a recording medium on which data is recorded in compliance with the AVCHD standard is proposed.
Under a root directory of partitions, an ICB and FIDs for each directory contained in a directory structure defined by the AVCHD standard are recorded with consideration of information on child directories. Thereafter, an SBD and a metadata bitmap file are recorded in a partition and also, an LVIS is recorded on the basis of information, such as the number of sectors used as a result of recording the ICBs and the FIDs of all the directories and the total number of directories.

9 Claims, 12 Drawing Sheets

FOREIGN PATENT DOCUMENTS

| | | |
|---|---|---|
| JP | 11-232792 | 8/1999 |
| JP | 2000-113641 | 4/2000 |
| JP | 2004 120364 | 4/2004 |
| JP | 2004-120364 | 4/2004 |
| JP | 2005 32439 | 2/2005 |
| JP | 2006-12221 | 1/2006 |
| WO | WO 00/30113 | 5/2000 |
| WO | WO 01/22416 A1 | 3/2001 |
| WO | WO 2004/095426 A2 | 11/2004 |
| WO | WO 2006/003573 A3 | 1/2006 |
| WO | WO 2006/009305 A1 | 1/2006 |

OTHER PUBLICATIONS

"Universal Disk Format Specification Revision 2.60", Optical Storage Technology Association, XP007905507, Mar. 1, 2005, 168 Pages.

"White Paper Blu-ray Disc Format: 2.B Audio Visual Application Format Specificaion", Blu-ray Disc Association, XP007903517, Mar. 31, 2005, 35 Pages.

Kiyohiko Ishikawa, et al., "New High Speed File Format for High Definition Television Optical Disks", Japanese Journal of Applied Physics, vol. 43, No. 7B, 2004, pp. 4900-4903.

* cited by examiner

DATA RECORDING DEVICE, DATA RECORDING METHOD, AND COMPUTER PROGRAM

TECHNICAL FIELD

The present invention relates to a data recording apparatus for recording data on a recording medium, to a data recording method, and to a computer program. For example, the present invention relates to a data recording apparatus for recording content, such as an AV stream, which is captured using a video camera, on a recording medium, to a data recording method, and to a computer program.

More particularly, the present invention relates to a data recording apparatus for recording data on a recording medium in compliance with AVCHD (Advanced Video Coding High Definition), to a data recording method, and to a computer program, and particularly relates to a data recording apparatus for recording a user data file, together with a management information file, in a prescribed directory, to a data recording method, and to a computer program.

BACKGROUND ART

Disc-type recording media to which optical reading is applied (hereinafter referred to as "optical discs"), such as DVDs (Digital Versatile Disks) and CDs (Compact Discs), have rapidly become popular for applications of storing computer files and movie streams. Optical discs have a large storage capacity and random accessibility. Unlike contact-type magnetic recording media, there are no concerns regarding wear and damage on a recording surface as a result of reading, head crash, or the like. Furthermore, the disc surface is sturdy, and the risk of data being accidentally deleted is low.

For example, UDF (Universal Disk Format) (registered trademark) established by OSTA (Optical Storage Technology Association) is known as an optical disc format having a high compatibility (for example, refer to Non-Patent Document 1). UDF is an implementation of the ISO/IEC 13346 standard that is also known as ECMA-167 (for example, refer to Non-Patent Document 2) (ISO/IEC 13346, which is a later version of ISO 9660, supports a larger disk capacity and a larger number of files than ISO 9660). In the 1990s, combined with the low price of CD-RW media and CD recorders, the UDF has widely been used for writable optical discs.

Recording and reproduction apparatuses using an optical disc have already been widely used as external recording media and external storage devices for, for example, computers. In recent years, as the recording capacity of disc-type recording media has increased, video cameras of the type that store movies on a disc rather than conventional recording tape have appeared (for example, refer to Patent Document 1).

Since disc-type recording media are random-accessible, it is possible to efficiently find a favorite scene. Also, since access to data is performed in a non-contact manner, it is possible to use media without causing deterioration thereof. For example, the number of users of DVD video cameras has increased year by year from the year 2000 and such cameras have been sold due to the virtues of high image quality and high ease of use, such as editing being possible.

Furthermore, an optical disc standard mainly targeted as applications for video cameras has already been considered. For example, in AVCHD (Advanced Video Coding High Definition), by adding a recording compatibility function and an additional recording compatibility function while appropriately inheriting the contents of the existing disc format standard, a specification regarding the data format for high definition (HD) video cameras or the like has been established.

For example, when a movie stream captured using a video camera is to be coded to an MPEG2-TS stream and recorded, in the case that a clip AV stream (ClipAV Stream) as content data is to be recorded, it is possible to suitably realize a video recording function by using each type of file of a playlist (PlayList) and clip information (ClipInformation). For the movie data, a collection of data, which is a unit necessitating playback for which continuous synchronization playback, that is, real-time playback, is guaranteed, forms one clip (Clip), and is recorded as one movie file. The clip AV stream is a file in which movie streams are stored in an MPEG-TS format. The clip information file exists in a pair with the clip AV stream file, and is a file in which information on a movie stream, which is necessary to reproduce a real movie stream, is described. For the playlist, a play start point (IN point) and a play end point (OUT point) are specified with regard to each of one or more clips, so that the playback section and the playback order of the movie data are specified.

FIG. 13 shows a directory structure defined by AVCHD. "PLAYLIST", "CLIPINF", and "STREAM", which are arranged directly below a BDMV directory are sub-directories for storing playlists, clip information files, and clip AV stream files, respectively. Directories of JAR, JO, and AUXDATA are not required in a video recording function in a VR mode, but are necessary to maintain compatibility with a past file format structure.

Since AVCHD is a new standard, there are no known disc recording apparatuses that are designed to create a directory and a file, which are defined by the AVCHD standard, at the time of an initialization process.

At this point, when a directory defined by the AVCHD standard is not created at the time of an initialization process, at one of timings of processes for recording a user data file, MV/STREAM that is a directory for storing an AV stream file, and MV/CLIPINF and MV/PLAYLIST, which are directories for storing management information on the user data, will be created. However, this poses the following problems.

For example, when, after an instruction for recording an AV stream from a user is accepted, the BDMV directory and the STREAM directory for storing the AV stream file are to be created, in practice, the recording of movie data is not started until the processing is completed, or a buffer for temporarily storing movie data until the processing is completed becomes necessary.

When a write error occurs when these directories are created and a retry process thereof is performed, the time required for the directory creation process can be very long. Until the creation of directories is completed, in the method in which the recording of an AV stream file is not started, the real-time-use capability of the apparatus for a user are considerably deteriorated. Also, in the method of providing a buffer for temporarily storing movie data, a buffer of a very large size becomes necessary.

In the AVCHD standard, with regard to one AV stream file, it is necessary to record corresponding management information files, such as a clip information file and a playlist. After an instruction for stopping the recording of the AV stream is received from the user, when CLIPINF, which is a directory for storing a management information file for the AV stream file, is to be created, the risk of the occurrence of an error due to the write process becomes high. When the creation of the CLIPINF directory fails due to the occurrence of an error, the management information file is not recorded, and it is not possible to reproduce the AV stream in spite of the fact that the AV stream was processed successfully.

Directories of AUXDATA, JO, JAR, and META among the directories defined by the AVCHD are not used in the process for recording user data, such as an AV stream. Therefore, even if there are no such directories, it is possible to record the AV stream file. For example, when these directories are to be created in the process of removing a recording medium from a recording apparatus, the following problems arise.

Initially, when the creation of the directory fails due to an error, in spite of the fact that the user data has been recorded successfully, an invalid state is reached in terms of the AVCHD standard, and there is a risk that the user data cannot be reproduced.

Since each of the directories of AUXDATA, JO, JAR, and META exists directly below the BDMV directory, when AUXDATA, JO, JAR, and META directories are to be created, it is also necessary to update the information on the BDMV directory in a commonly used file system such as UDF. If a write error occurs in the course of this processing and the updating of the BDMV directory fails, a state is reached in which the user data cannot be referred to in spite of the fact that the user data was recorded successfully.

For example, the UDF has meta-information, such as the position of the entity of a file and file attributes as an ICB (Information Control Block) in units of directories and files. The ICB of the directory contains point information for each of FIDs (File Identifier Descriptors) in which the recording position of the ICB regarding a child directory directly below and a file is described. The creation of the AUXDATA, JO, JAR, and META directories directly below the BDMV directory necessitates the creation of an ICB and FIDs, which are the meta-information of each directory of AUXDATA, JO, JAR, and META and also necessitates the updating of the FID of the BDMV directory. For this reason, there is a possibility that a write error occurs when each directory of AUXDATA, JO, JAR, and META is created and also, there is a possibility that a write error occurs when the meta-information of the BDMV directory is updated.

[Patent Document 1]
Japanese Unexamined Patent Application Publication No. 2004-120364

DISCLOSURE OF INVENTION

Problems to be Solved by the Invention

An object of the present invention is to provide a superior data recording apparatus capable of recording data on a recording medium in compliance with the AVCHD standard, a superior data recording method, and a superior computer program.

Another object of the present invention is to provide a superior data recording apparatus capable of recording user data on a recording medium in a file format having a video recording function without deteriorating the real-time-use capability of the apparatus and without using a large buffer, a superior data recording method, and a superior computer program.

Another object of the present invention is to provide a superior data recording apparatus capable of recording a user data file, together with a management information file, in a prescribed directory in accordance with a video recording format, a superior data recording method, and a superior computer program.

Another object of the present invention is to provide a superior data recording apparatus capable of suitably preventing a situation in which the reference or the reproduction of user data becomes inoperable due to an occurrence of a write error as a consequence of the creation of a directory, a superior data recording method, and a superior computer program.

Means for Solving the Problems

The present invention has been made in view of the above-described problems. According to a first aspect of the present invention, there is provided a data recording apparatus for recording data on a recording medium, the data recording apparatus including: physical formatting means for performing physical formatting on a new recording medium; file system creation means for creating a file system on the basis of a predetermined file system format in a storage area of the recording medium after physical formatting is performed; and directory structure creation means for creating a directory structure for storing a user data file and a management information file for the user data file in compliance with a predetermined coding standard in accordance with the predetermined file system format.

The predetermined coding standard referred to herein is the AVCHD (Advanced Video Coding High Definition) standard. In AVCHD, for example, when a movie stream captured using a video camera is coded into an MPEG2-TS stream and recorded, it is possible to suitably realize a video recording function by using each type of file of a playlist, clip information, and a clip AV stream.

In AVCHD, a directory structure as shown in FIG. 13 is defined. At least in the stage of removing a recording medium from the recording apparatus, such a directory structure needs to be satisfied. However, since AVCHD is a new standard, there are no known disc recording apparatuses that are designed to create a directory and a file, which are defined by the AVCHD standard, at the time of an initialization process.

For example, when an AV stream file is to be recorded, in the case that MV/STREAM, MV/CLIPINF, and MV/PLAYLIST are to be created, a delay occurs due to the directory creation process, and real-time-use capability of the apparatus is deteriorated. Furthermore, a buffer becomes necessary to temporarily store a stream until the creation of these directories is completed. When these directories are created, the risk of the occurrence of an error due to a write process becomes high.

Furthermore, when the recording of the AV stream file is to be quickly performed, the creation of a directory that is not used in the user data recording process is further postponed. For example, when a recording medium is to be removed, in the case that the creation of these directories fails, in spite of the fact that the user data has been recorded successfully, an invalid state is reached in terms of the AVCHD standard. Alternatively, even if the creation of these directories succeeds, if a write error occurs when the management information of a parent directory is updated, the user data that should have been recorded successfully cannot be reproduced.

Accordingly, in the data recording apparatus according to the present invention, when the use of a new recording medium is to be started, physical formatting and a file system recording process are performed. In addition, the directory structure creation means creates a BDMV directory directly below a root directory provided in the partition, which is a space for recording a file, by the file system creation means in compliance with the AVCHD standard, and also creates, directly below the BDMV directory, directories of a stream directory for storing stream files, a PLAYLIST directory and a CLIPINF directory for storing playlists and clip information files, respectively, serving as management information files of the clip AV stream file, and the directories of AUXDATA, JO, JAR, and META.

In the manner described above, according to the data recording apparatus of the present invention, when a process for initializing a recording medium is to be performed, a directory and a file that are defined by the AVCHD standard are created, and therefore, the above-mentioned process for creating a directory and a file does not need to be performed in a subsequent user operation process. That is, since a directory creation process does not occur while the user data is being recorded, the real-time-use capability of the apparatus is improved. Furthermore, since a directory creation process does not occur after initialization is performed, the risk of a write error occurring in a state in which user data is recorded can be decreased and also, the risk of an occurrence of the loss of user data due to the error can be prevented.

The file system creation means creates, for example, a file system in a recording area of a recording medium in accordance with the UDF format established by OSTA. In the UDF, for newly creating a directory, it is necessary to perform processes for creating an ICB containing information indicating the location where the real data of the directory is recorded and for recording it in a metadata partition and also perform processes for recording, as the real data of the directory, an FID group, that is, FIDs, which indicate the location where each ICB is recorded with regard to a child directory directly below or a file in a metadata partition.

Therefore, the directory structure creation means records, in a metadata partition in the partition created by the file system creation means, an information control block (ICB) containing information indicating the recording location where real data is recorded with regard to each directory contained in the directory structure defined by the predetermined coding standard, and metadata formed of a collection of file identification information descriptors (FIDs) containing information indicating the recording location of the information control block of a directory stored directly below the directory as the real data or a file.

In a commonly used file system, such as UDF, when creating a directory, it is necessary to record the data of such a directory and also necessary to update the management information on the entire medium, such as the total number of directories, and the available area/the available capacity of the recording medium. For example, in the UDF format, it is necessary to not only record an ICB and FIDs for each directory but also add an FID indicating the ICB of the new directory to the FIDs of the parent directory in a metadata partition. Furthermore, it is necessary to perform an updating process on used area management information (metadata bitmap file) as a result of recording the ICB and the FIDs of the directory in the metadata partition.

Accordingly, the directory structure creation means records, under the root directory of the partition created by the file system creation means, the ICB and the FIDs regarding each directory contained in the directory structure defined by the predetermined coding standard with consideration of the information on the child directories lower in the hierarchy of the directory structure.

Then, after the directory structure is created by the directory structure creation means, the file system creation means records, in the partition, each file for managing the used area in the partition and the used area in the metadata partition and also records a logical volume integrity sequence (LVIS) on the basis of information, such as the number of sectors used as a result of recording the ICB and the FIDs of all the directories in the metadata partition, and the total number of directories.

In the manner described above, in the data recording apparatus according to the present invention, the data of each directory that is necessary at the time of initializing a recording medium is created with consideration of the information on the child directory thereof. Therefore, it is possible to construct file system information with consideration of the total number of directories and the available area/the available capacity in the recording medium. This is more efficient when compared with the case in which directory data is individually created when user data is operated after the initializing process is once completed.

Since necessary directory data is created in coincidence with the initialization of a recording medium in the manner described above, it is possible to suppress disc access that occurs in a normal directory/file creation process by constructing file system information with consideration of the total number of directories and the available area/the available capacity in the medium.

When directory information is recorded in a commonly used file system, these pieces of information are often arranged at nearby positions. Therefore, a data layout that is convenient when caching directory information is completed naturally.

According to a second aspect of the present invention, there is provided a computer program described in a computer-readable format, the computer program enabling a computer to perform processing for recording data on a recording medium, the processing including: a physical formatting step of performing physical formatting on a new recording medium; a file system creation step of creating a file system on the basis of a predetermined file system format in a storage area of the recording medium after physical formatting is performed; and a directory structure creation step of creating a directory structure for storing a user data file and a management information file for the user data file in compliance with a predetermined coding standard in accordance with a predetermined file system format.

The computer program according to the second aspect of the present invention is such that a computer program described in a computer-readable format so as to implement predetermined processing in a computer is defined. In other words, as a result of installing a computer program according to the second aspect of the present invention into a computer, coordinated operation is exhibited in the computer, and the same operational advantages as those of the data recording apparatus according to the first aspect of the present invention can be obtained.

Advantages

According to the present invention, it is possible to provide a superior data recording apparatus capable of performing a process for initializing a recording medium, which is suitable to record data in compliance with the AVCHD standard, a superior data recording method, and a superior computer program. Therefore, it is possible to record user data on a recording medium in a file format having a video recording function without deteriorating the real-time-use capability of the apparatus and without using a large buffer.

According to the present invention, it is possible to provide a superior data recording apparatus capable of recording a user data file, together with a management information file, in a prescribed directory in accordance with a video recording format while avoiding a situation in which the reference or reproduction of user data becomes inoperable due to an occurrence of a write error as a result of the creation of a directory, a superior data recording method, and a superior computer program.

In the data recording apparatus according to the present invention, user data is recorded on a recording medium such as an optical disc in compliance with, for example, the AVCHD standard. When performing a process for initializing a recording medium, a directory and a file, which are defined by the AVCHD standard, are created. Therefore, the above-mentioned process for creating a directory and a file does not need to be performed in a subsequent user operation process.

That is, since a directory creation process does not occur while the user data is being recorded, the real-time-use capability of the apparatus is improved. Furthermore, since a directory creation process does not occur after initialization is performed, the risk of a write error occurring in a state in which user data is recorded can be decreased and also, the risk of an occurrence of the loss of user data due to the error can be prevented.

In a commonly used file system, when creating a directory, it is necessary to not only record the data of such a directory, but also to update the management information of the entire medium, such as the total number of directories and the available area/the available capacity in the medium. In comparison, in the data recording apparatus according to the present invention, since necessary directory data is created at the time of initializing a recording medium, it is possible to construct file system information with consideration of the total number of directories and the available area/the available capacity in the medium. This is more efficient when compared with the case in which directory data is individually created when user data is operated after the initializing process is once completed.

Furthermore, in the data recording apparatus according to the present invention, since necessary directory data is created in coincidence with the initialization of a recording medium, it is possible to suppress disc access that occurs in a normal directory/file creation process by constructing file system information with consideration of the total number of directories and the available area/the available capacity in the medium. This leads to an improved processing speed and improved robustness of media.

In the data recording apparatus according to the present invention, when a recording medium is to be initialized, directories are collectively created. When directory information is recorded by a commonly used file system, these pieces of information are often arranged at nearby positions. Therefore, when a recording medium is loaded into a data recording apparatus or a playback apparatus having a cache function, directory information is collectively cached, and there is a secondary effect of an increased probability of a cache hit occurring.

Other objects, features, and advantages of the present invention will become apparent from the more detailed description on the basis of the embodiments of the present invention as will be described later and the attached drawings.

REFERENCE NUMERALS

| | |
|---|---|
| 1 | camera block |
| 2 | coder |
| 3 | stream buffer |
| 4 | recorder |
| 4-1 | recording medium |
| 5 | central processing unit |
| 6 | temporary storage medium |
| 10 | data recording apparatus |
| 13 | OP unit |
| 14 | RF processor |
| 15 | servo signal processor |
| 16 | analog filter processor |
| 17 | signal processor |
| 18 | spindle driver |
| 19 | sled driver |
| 20 | tracking driver |
| 21 | focus driver |
| 22 | spindle motor |
| 23 | sled motor |
| 25 | recording medium (optical disc) |

BEST MODE FOR CARRYING OUT THE INVENTION

Embodiments of the present invention will be described below in detail with reference to the drawings.

A. System Configuration

Figure 1:
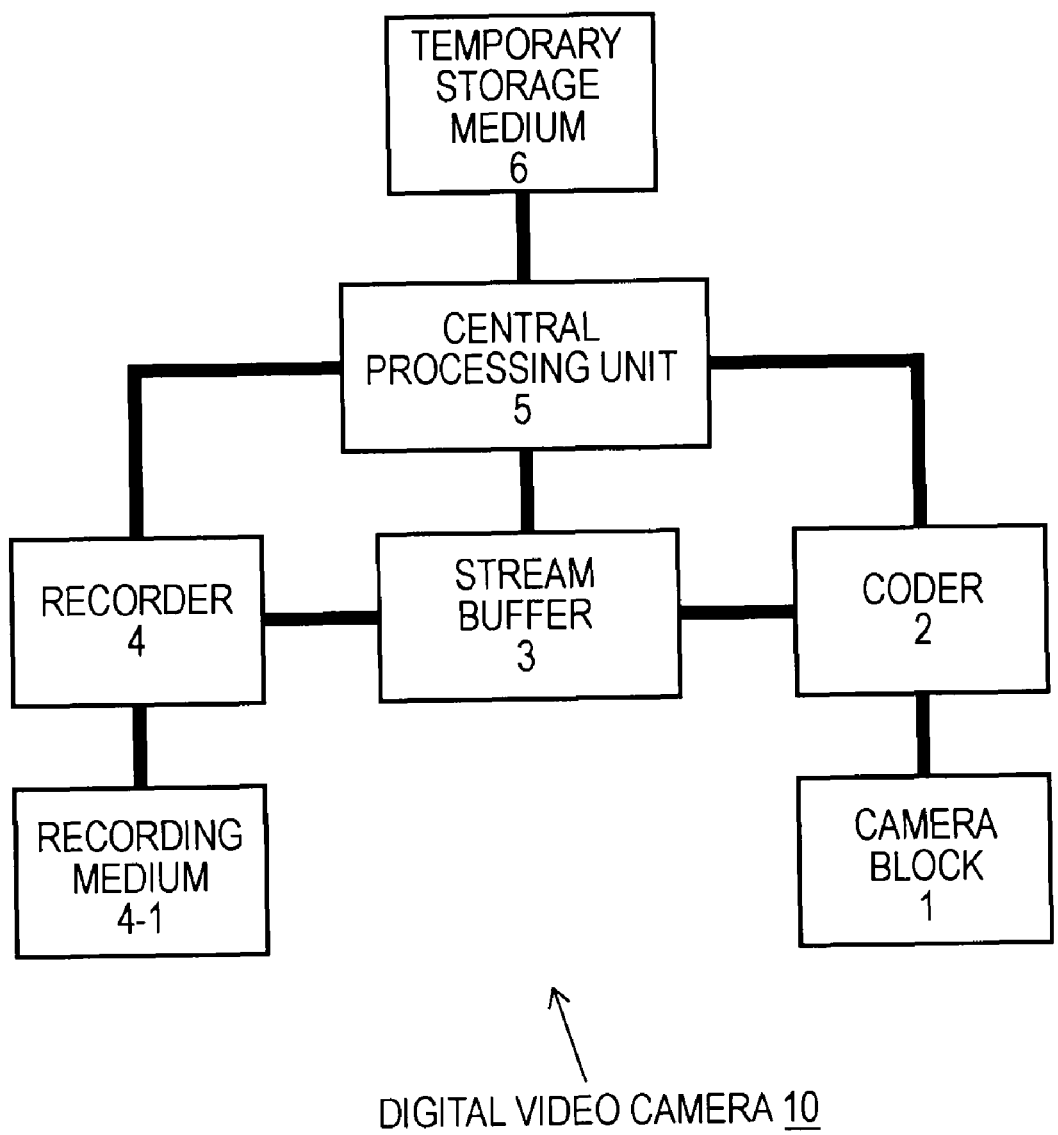
FIG. 1 schematically shows the functional configuration of a data recording apparatus 10 according to an embodiment of the present invention.

FIG. 1 schematically shows the functional configuration of a data recording apparatus 10 according to an embodiment of the present invention.

The data processing apparatus 10 shown in the figure is configured as a video camera in which a movie stream captured using a camera block 1 is coded using a coder 2 and is multiplexed into an MPEG-TS stream, and this stream is recorded on a recording medium 4-1 loaded into a recorder 4. However, the data recording apparatus 10 is not necessarily a video camera, and may be a data recording apparatus for receiving a movie stream via a LAN and other transmission media. Furthermore, when a TS stream coded in an MPEG format is to be received, the construction is formed in such a way that the coder 2 is omitted and instead, a stream receiver (not shown) is provided. The recording medium 4-1 is not limited to an optical disc, and the type of medium does not particularly matter as long as the medium has a recording capacity enough to store a stream file.

A central processing unit 5 loads an execution program into a temporary storage medium 6 formed by a RAM (Random Access Memory) or the like, centrally controls the processing operation of the entire data recording apparatus 10 in a form in which a program is executed while temporarily storing system variables and environment variables. Examples of processing operations referred to herein include movie capturing in the camera block 1, camera work, such as an auto-focus function, automatic exposure, camera-shake correction, and auto shutter involving the movie capturing, recording of a movie stream on the recording medium 4-1 in the recorder 4, a process for editing streams recorded on the recording medium 4-1, and a process for formatting/initializing a recording medium loaded into the recorder 4.

The camera block 1 includes a lens for receiving a subject image, solid-state imaging devices such as a CCD (Charge Coupled Device) and a CMOS (Complementary Mental-Oxide Semiconductor) for generating an electrical image signal by photo-electrical conversion in response to the amount of input light, an A/D converter for converting an image signal into digital form, and a demosaic processor (not shown) for computing an RGB signal from a digital image signal.

The coder 2 codes a movie stream by an MPEG-2 method and outputs an AV stream formed of TS packets of a fixed byte length. The TS packets are temporarily stored in the stream buffer 3, and the recorder 4 records them on the recording medium 4-1. When the recorder 4 receives TS packet data via the stream buffer 3 at a specific time interval, the recorder 4 records them on the recording medium 4-1.

After the recording medium 4-1 is initialized, the recorder 4 records an AV stream and other user data. Data recording in compliance with the AVCHD standard can be performed and a video recording function can be implemented. The details of the directory structure after the formatting process is performed, the data layout on the medium, and the video recording function will be described later.

Figure 2:
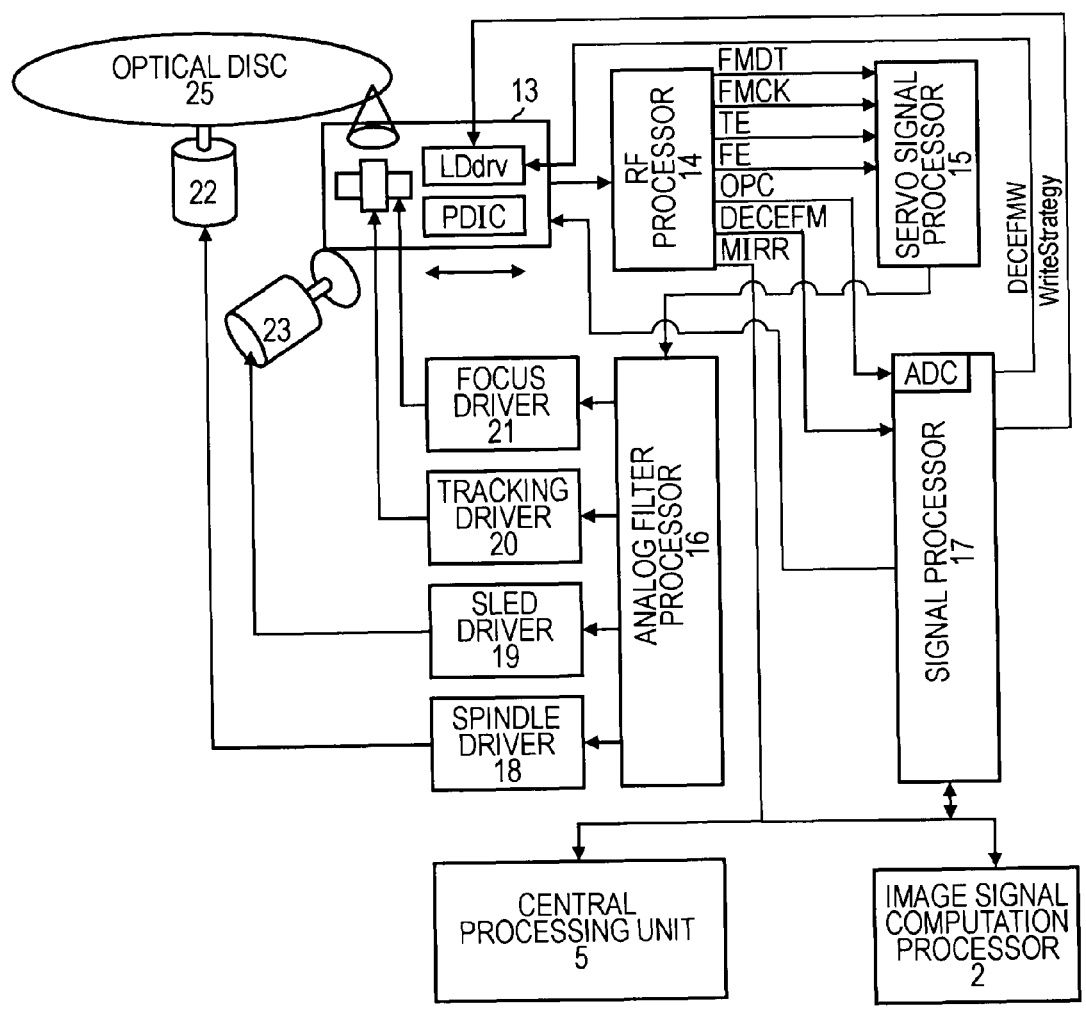
FIG. 2 shows the internal hardware configuration of a recorder 4.

FIG. 2 shows the internal hardware configuration of the recorder 4.

The OP (Optical Pickup) unit 13 includes an objective lens, a laser diode (LD) driver (LDdrv), a photo detect IC (Photo Detect IC), a half mirror, and the like. When data is to be reproduced, a reflected light signal from the recording surface of an optical disc 25 with respect to irradiated laser light is detected and output to an RF processor 14. When data is to be recorded, data is written to an optical disc 25 on the basis of a laser blinking drive signal (DECEFMW) from a signal processor 17, which is necessary for forming pits, a write strategy signal (WriteStrategy) indicating optimum values of a laser intensity, blinking, and the like. The term write strategy is a technology for correcting laser pulses at a writing time in the time direction and in the level direction for each pit so that the pit size after writing is performed satisfies the standard.

The RF processor 14 samples and holds eight type signals composed of beam signal, side, main detected by the OP unit 13, performs a computation process thereon, and generates signals of FE (focus error), TE (tracking error), MIRR (mirror), ATIP (Absolute Time In Pregroove), a main read signal, and the like on the basis of predetermined signals among the signals of the eight systems. The RF processor 14 outputs FMDT (frequency modulation data), FMCK (frequency modulation clock), TE, and FE among the generated signals to the servo signal processor 15, outputs an optimum value (OPC: optical power calibration) signal of the laser intensity detected by trial Writing and a laser blinking driving signal DECEFM to the signal processor 17, and outputs MIRR to the central processing unit 5.

When the servo signal processor 15 receives FMDT, FMCK, TE, and FE from the RF processor 14, the servo signal processor 15 generates various servo control signals unique to an optical disc in response to instructions from the central processing unit 5 and outputs them to an analog filter processor 16.

On the basis of various servo control signals from the servo signal processor 15, the analog filter processor 16 generates an analog signal and outputs it to a spindle driver 18, a sled driver 19, a tracking driver 20, and a focus driver 21.

Under the control of the central processing unit 5, the signal processor 17 receives OPC and DECEFM from the RF processor 14, and performs processing such as CIRC (Cross Interleave Reed-Solomon Code) decoding and encoding, write strategy, ADDr decoding, asymmetry calculation, running OPC, etc. In writing data to the optical disc 25, the signal processor 17 outputs blinking and drive signals (DECEFMW) of a laser, write strategy (WriteStrategy) signals indicative of the optimum value of the laser intensity to a laser diode driver (LDdrv) of the OP unit 13.

The spindle driver 18 controls the rotation of the spindle motor 22 on the basis of signals from the analog filter processor 16. The sled driver 19 controls sled operation of the sled motor 23 on the basis of signals from the analog filter processor 16. The tracking driver 20 swings the OP unit 13 on the basis of signals from the analog filter processor 16 in order to control the position of a beam spot irradiated onto the recording surface of the recording medium 25. The focus driver 21 perpendicularly moves the OP unit 13 toward the recording surface of the recording medium 25 on the basis of signals from the analog filter processor 16 in order to control the focal point of a laser beam. The spindle motor 22 rotates the optical disc 25 on the basis of signals form the spindle driver 18. The sled motor 23 performs sled operation of the OP unit 13 on the basis of signals form the sled driver 19.

The central processing unit 5 uses the temporary storage medium 6 as a work memory (described above), and stores file system data regarding a UDF file system that is updated each time a file and a directory are updated, added, or deleted just before the main power of the apparatus 1 is turned off.

When data is to be read from the optical disc 25, the light of the laser diode, which is reflected from the recording surface, is read by the lens optical system of the OP unit 13. The light from the lens optical system is converted into an electrical signal by PDIC and thus converted electrical signals are sampled and held in the RF processor 14, and signals such as FE, TE, MIRR, ATIP, and read main signals are generated from predetermined eight type signals by the computation operation.

At first, FE obtained by the RF processor 14 has its characteristics adjusted by the servo signal processor 15, and passes through the analog filter processor 16 and then is sent to the focus driver 21. The focus driver 21 moves a lens drive focus coil (not shown) of the OP unit 13 upward and downward to correct deviation of focus.

The TE obtained by the RF processor 14 has their AC components extracted by the servo signal processor 15, and undergoes digital filter processing. Then, the thus processed TE passes through the analog filter processor 16 and is sent to the tracking driver 20. The tracking driver 20 finely moves a lens drive tracking coil of the OP unit 13 along the radial direction to correct deviation of tracking.

The TE obtained by the RF processor 14 has their DC components extracted by the servo signal processor 15, and undergoes digital filter processing. Then, the thus processed DC components passes through the analog filter processor 16 and are sent to the sled driver 19. The sled driver 19 operates the sled motor 23, and moves the whole OP unit 13 along the radial direction of a recording medium in order to correct deviation of sled operation. At the time of seek operation, a sled control voltage is intentionally applied from outside so as to forcedly drive the sled motor.

In the manner described above, tracking operation is performed to finely move only the lens along the radial direction on the basis of the AC components of the TE, and sled operation is performed to move the whole OP unit 13 along the radial direction on the basis of the DC components thereof.

Since detection signals (mirror) of reflectance variation of a recording medium output from the RF processor 14 is detected when the OP unit 13 crosses tracks, by counting the mirror, the detection of the current seek position and reading position, and starting and stopping of the optical picking-up operation are performed.

The spindle motor 22 is controlled on the basis of an ATIP process. Temporal information is recorded in meandering grooves referred to as wobble grooves written on the optical disc 25 by FM modulation of ±1 KHz at the center frequency of 22.05 KHz along the radial direction. Temporal information referred to as the ATIP is modulated in bi-phase modulation.

When focus and tracking operation is correctly performed, the RF processor 14 takes out wobble signals from predetermined combinations of received eight type signals. The wobble signals undergo FM demodulation and ATIP decoding, and are taken out as FMCK and FMDT. The FMDT is stored at an absolute time position of the optical disc 25, that is, at a predetermined register classified as an address and other additional information by the servo signal processor 15, and in response, data is read.

A signal corresponding to a recording pit is taken out from predetermined combinations of eight type signals in the RF processor 14, and undergoes equalizing processing, and is sent to the signal processor 17 with its signal state remaining in the form of an EFM (Eight to Fourteen Modulation) signal. Then, the signal processor 17 can perform decoding on the basis of the CIRC to obtain desired data.

In writing data to the optical disc 25, firstly, a pickup is moved to the lead-in area to read out the ATIP information. Then, special information is read from within it to detect the start position of the lead-in area. Usually, the start position is stored as temporal information. The information written in the special information corresponds to an individual identification code of the optical disc 25. The relevant apparatus 1 stores in advance a write strategy parameter corresponding to the individual identification code and other associated parameters as a table. A correction parameter is provided for each recording medium in advance.

Next, OPC (Optical Power Calibration) operation to determine the optimum value of laser output is performed. The above-described write strategy finely controls a laser every writing pit, while the OPC calculates the optimum value of the whole. By performing the OPC, a writing setting value corresponding to an ideal reading target value can be obtained.

In writing data, after performing CIRC or EFM encoding on compressed captured image data provided in the data buffer 3, blinking and drive signals of a laser and write strategy signals necessary in forming pits are input to a laser driver of the OP unit 13. At this time, writing processing is performed by setting the timing to a predetermined position in accordance with a file system with an address of a frame unit obtained from the FMDT signals, which is obtained by decoding the ATIP, being a reference. At the first writing, writing processing starts from a position skipped by an area of approximately 20 Mbyte, which is the lead-in area at the time of a later closing session.

B. Data Format

Movie data captured using a video camera is recorded as a clip on the basis of a pair of a clip AV stream and a clip information file that defines the attributes of the clip AV stream.

Figure 13:
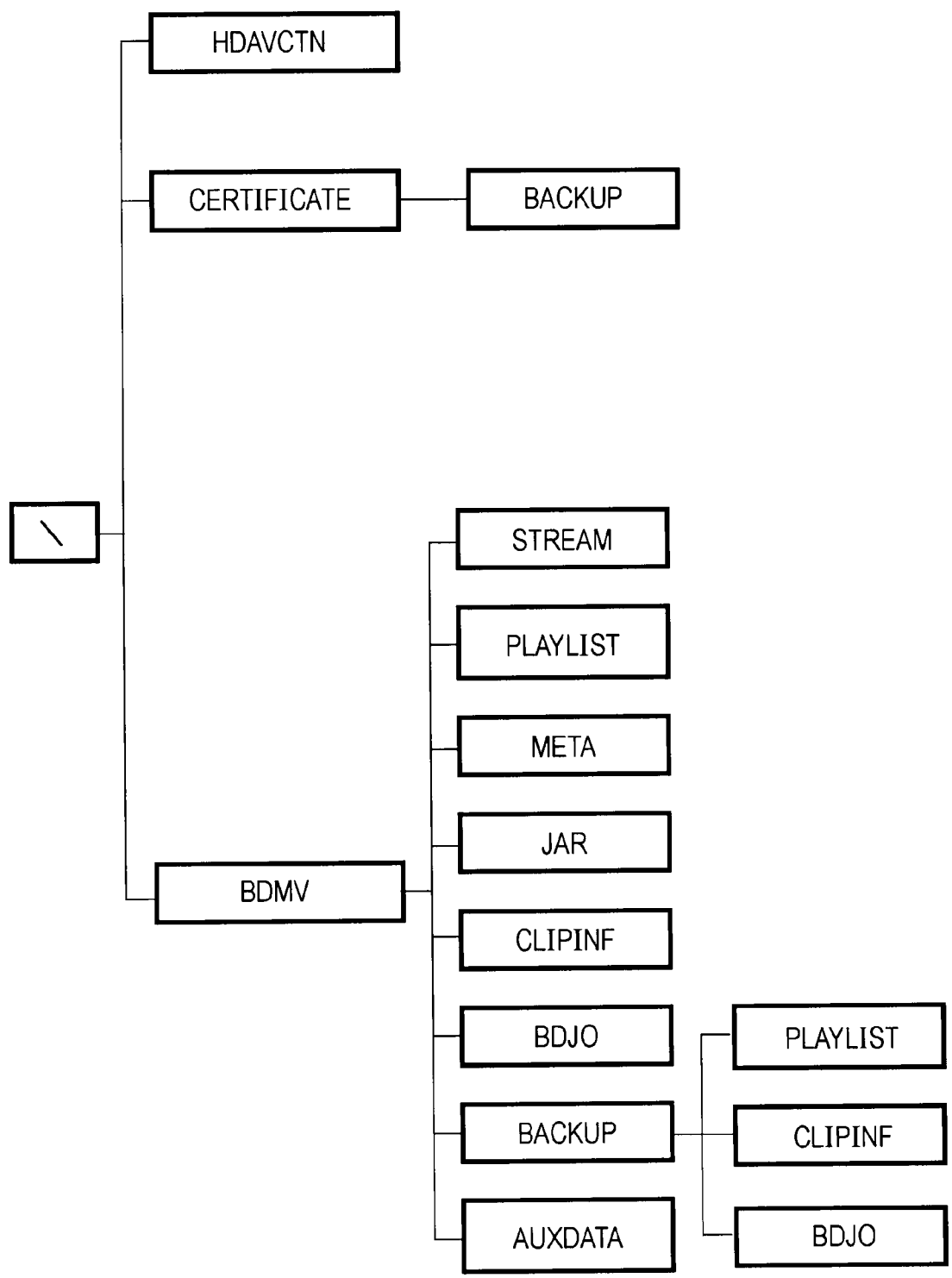
FIG. 13 shows a directory structure defined by AVCHD.

The directory structure of a recording medium, which is defined by the AVCHD standard, is shown in FIG. 13. "PLAYLIST", "CLIPINF", and "STREAM", which are arranged directly below a BDMV directory, are sub-directories for storing playlists, clip information files, and clip AV stream files, respectively.

For the movie data, a collection of data, which is a unit necessitating playback for which continuous synchronization playback, that is, real-time playback, is guaranteed, forms one clip (Clip), and is recorded as one movie file. The clip AV stream is a file in which movie streams are stored in an MPEG2-TS format. The clip information file exists in a pair with the clip AV stream file, and is a file in which information on a movie stream, which is necessary to reproduce a real movie stream, is described. The playlist is formed of a plurality of play items (PlayItems). Each play item specifies a play start point (IN point) and a play end point (OUT point) with respect to a clip, and the playback section and the playback order of movie data are specified by the series of play items in the playlist.

Figure 3:
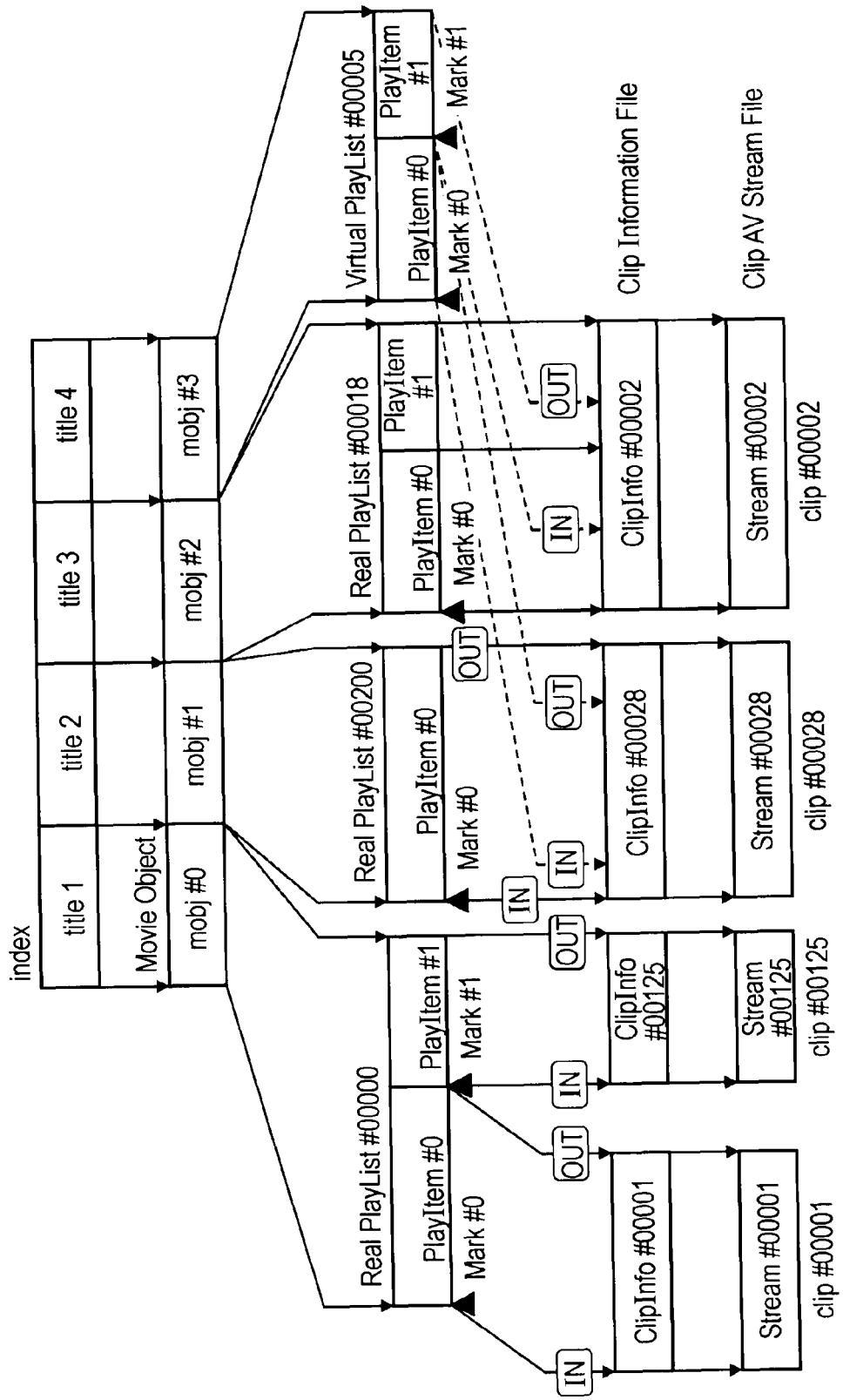
FIG. 3 shows an example of a data structure for recording user data in a format in which video recording/editing is possible.
Figure 4A:
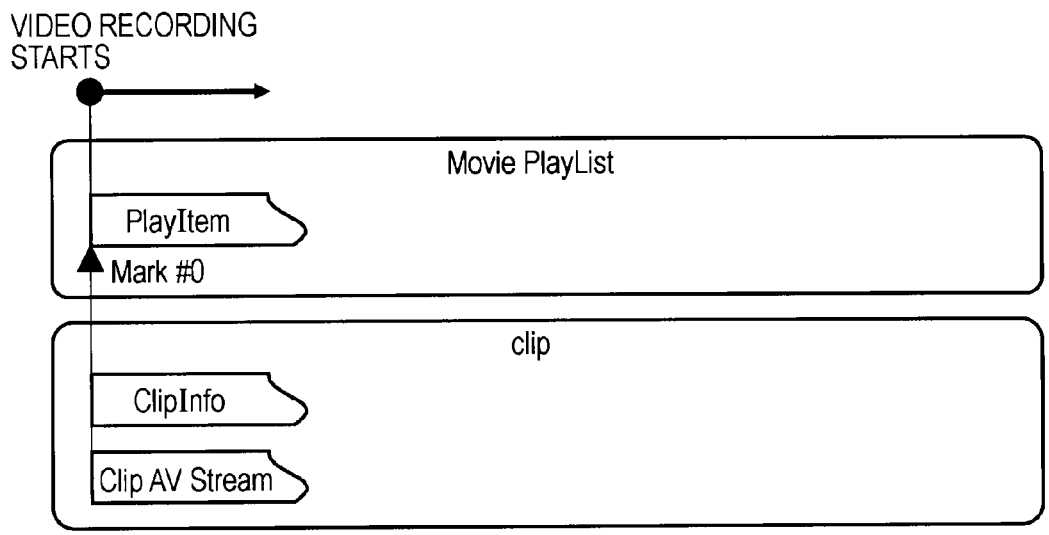
FIG. 4A illustrates a procedure for creating a clip of an AV stream as well as a playlist in accordance with video recording and capturing using a video camera.
Figure 4B:
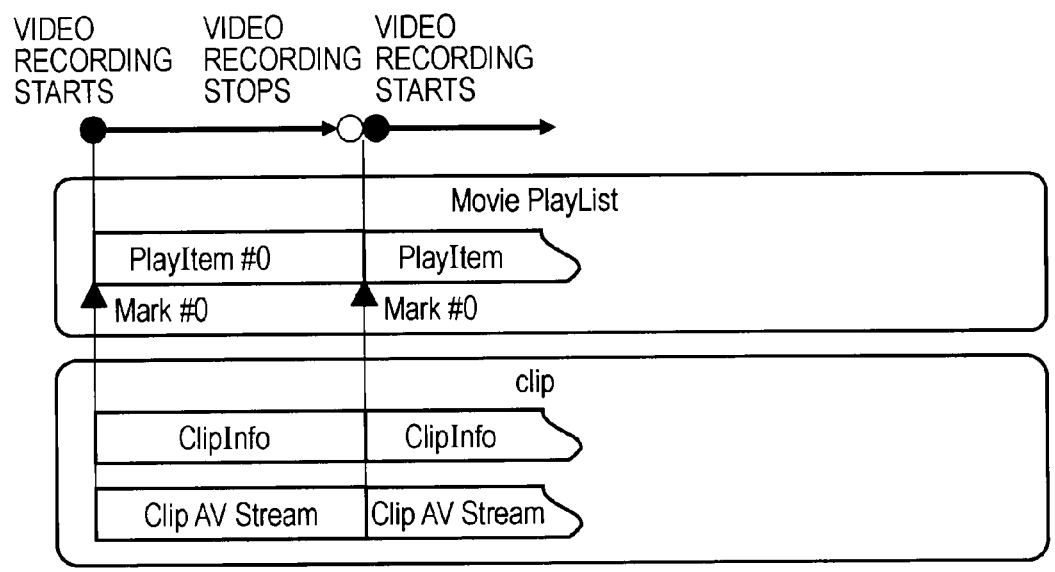
FIG. 4B illustrates a procedure for creating a clip of an AV stream as well as a playlist in accordance with video recording and capturing using a video camera.
Figure 4C:
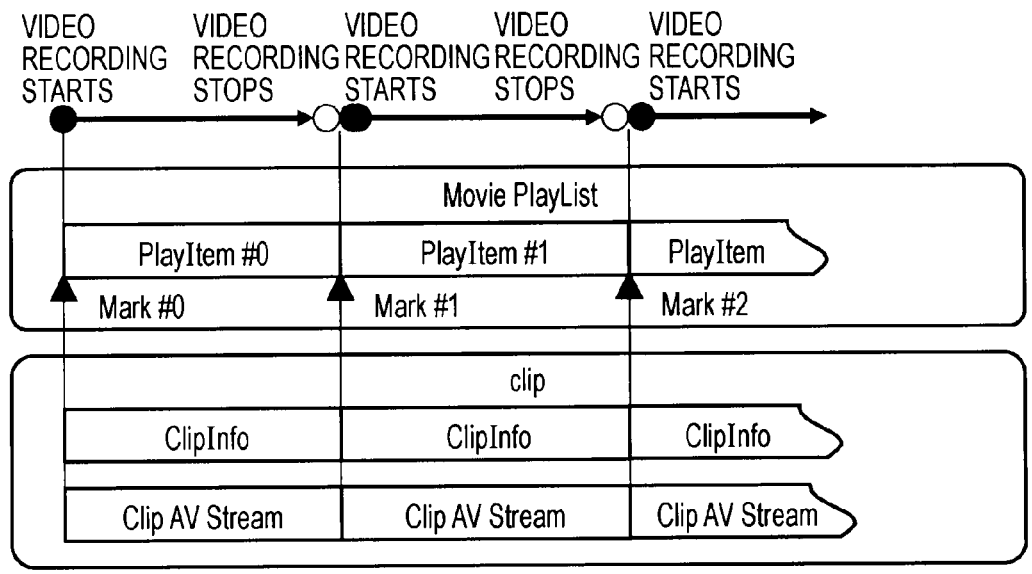
FIG. 4C illustrates a procedure for creating a clip of an AV stream as well as a playlist in accordance with video recording and capturing using a video camera.
Figure 4D:
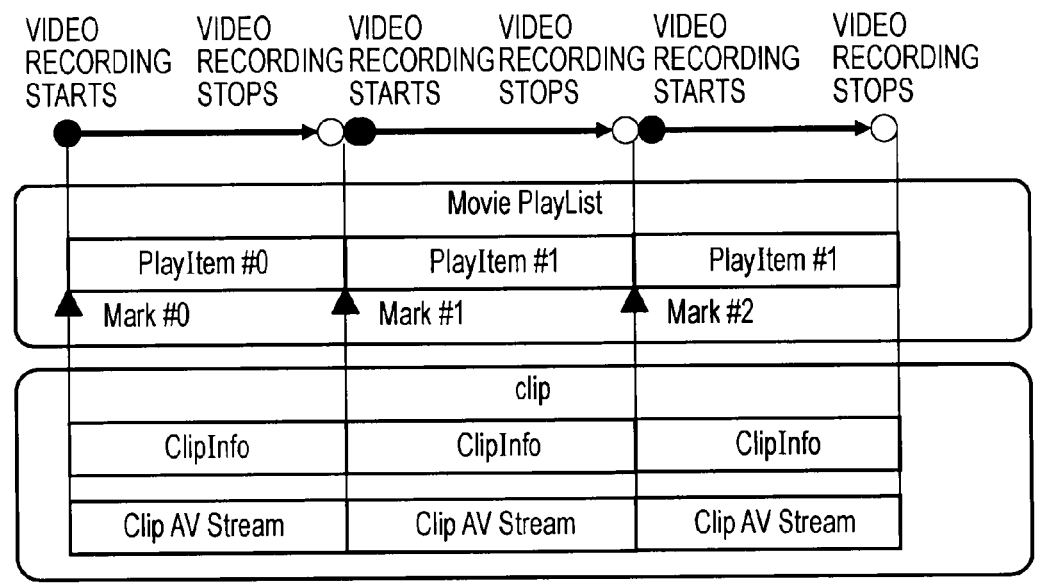
FIG. 4D illustrates a procedure for creating a clip of an AV stream as well as a playlist in accordance with video recording and capturing using a video camera.

FIG. 3 shows an example of a data structure in which user data is recorded on the recording medium 14-1 in a form in which video recording editing is possible. As shown in the figure, when movie data captured using a video camera is to be coded into an MPEG2-TS stream and recorded, files of various types of an index (index), a movie object (MovieObject), a playlist (PlayList), clip information (ClipInformation), and a clip AV stream (ClipAV stream) are used.

TABLE 1

| File Type | Maximum Number | Role |
|---|---|---|
| index | 1 | Root file used to manage the entire medium. Manages the correspondence between titles to be viewed by a user and movie objects. In the HD-AVC format, manages the order in which a playlist is reproduced, which should be originally managed by a movie object file, within the metadata of the index file. |
| Movie Object | 1 | File used to manage playlist that is reproduced when a title is specified. In the HD-AVC format, the correspondence between playlists and titles is managed on the basis of metadata within the index file without referring to this file. |
| Real Playlist | Total 2000 | Playlist for an original title. Video movie that is recorded/reproduced is registered in a recording order. |
| Virtual Playlist | | Playlist used to create user-defined playlist by nondestructive editing. Does not have a clip unique to a virtual playlist, and a clip registered in one |

TABLE 1-continued

| File Type | Maximum Number | Role |
|---|---|---|
| | | of real playlists is indicated and is reproduced. |
| Clip Information | 4000 | Exists in a pair with a clip AV stream file. Information on a stream necessary to reproduce a real stream is described. |
| Clip AV Stream | 4000 | File in which a stream recorded using MPEG2-TS is stored. Image data of AVC is stored in this file. |

The entire storage area on the recording medium 4-1 is managed by the file type layer of the index (index.BDMV). The index file is created for each title to be viewed by the user so that the correspondence with movie objects is managed. The "title (Title)" referred to herein is a collection of (user recognizable) playlists (PlayLists), and in general, is formed of one program and content for each date. In the AVCHD standard format, the order in which playlists are reproduced, which should originally be managed by the movie object file, is managed within metadata of the index file. When a recording medium is loaded into a player, first, an index is read, and the user is able to view titles described in indexes.

The movie object is a collection of commands used to control reproduction and is, for example, a file used to manage a playlist from which a title is reproduced when it is specified in the existing ROM standard format. References to the movie objects are listed in indexes as entries of titles. However, in the AVCHD standard format, the relationship between the playlists and the titles are managed using metadata of the index file without referring to the movie object file.

The playlist is provided in such a manner as to correspond to a title to be viewed by the user, and is formed of one or more play items (PlayItems). Each play item has playback section data formed of a play start point (IN point) and a play end point (OUT point) for a clip, thereby specifying the playback section of the clip AV stream. Then, as a result of arranging a plurality of play items in the playlist, it is possible to specify the order in which playback sections are reproduced. Furthermore, it is possible to contain play items that specify a playback section in different clip AV stream files in one playlist. In other words, entities corresponding to a group of play items contained in one playlist is not limited to one clip AV stream file and play items that refer to different clips can be contained in one playlist.

The relationship of reference between clips and playlists can be set freely. For example, reference to one clip can be made from two different PlayLists at the IN point and at the OUT point. Furthermore, the relationship of reference between titles and movie objects can be freely set. The playlist is broadly classified into two types of a real playlist (RealPlayList) and a virtual playlist (VirtualPlayList) on the basis of the reference relationship with clips.

The real playlist is a playlist for an original title, in which play items for a video stream recorded and captured using a video camera are arranged in the order in which they are recorded.

The virtual playlist is a playlist used to create a user-defined playlist by nondestructive editing, and does not have a clip (AV stream) unique to the virtual playlist. The play item in the playlist indicates one of clips registered in the real playlist or in the range of a portion thereof. That is, it is possible for the user to extract only the necessary playback section from a plurality of clips and to edit a virtual playlist by collecting (copying) play items indicating the section.

The clip is a file of movie data that is recorded as a collection of data, which is a unit necessitating playback for which continuous synchronization playback, that is, real-time playback, is guaranteed, and is formed of a clip AV stream file (Clip AV stream) and a clip information file (Clip Information).

The clip AV stream as content data is a file in which a stream is recorded on the recording medium 14-1 in accordance with the MPEG-TS format. Image data of the AVC is stored in this file.

The clip information file is a file that exists in a pair with the clip AV stream file and that defines attributes regarding a movie stream, which become necessary to reproduce a real movie stream. More specifically, a coding method of a movie stream, the size of a movie stream, playback time→address conversion, playback management information, and information that defines a time map (when the recording medium is a DVD) and the like, are contained in the clip information file.

As has already been described with reference to FIG. 13, in the directory structure defined by AVCHD, "PLAYLIST", "CLIPINF", and "STREAM" are arranged directly below the BDMV directory and are used to store playlists, clip information files, and clip AV stream files, respectively.

Next, a description will be given, with reference to FIGS. 4A to 4D, of an example of a procedure in which a clip of a clip AV stream and a playlist are created in accordance with video recording and capturing using a video camera.

As shown in the figure, one play item is created for each section from when the user starts video recording until the video recording is stopped. For example, the section from when recording is started first until the recording is stopped is registered in a movie playlist (Movie PlayList) as a play item (PlayIteM #0) having a serial number 0. Furthermore, the section from when the recording is started next until the recording is stopped is registered in a movie playlist (Movie PlayList) as a play item (PlayIteM #1) having a serial number 1 (the same applies hereinafter).

The real playlist has one-to-one correspondence with the content of an entity, that is, a clip AV stream. The individual play items registered in the real playlist hold time information on the play start point and the play end point of the corresponding playback section of each of the clip AV streams. Furthermore, in a movie stream, including an MPEG2-TS, as a result of performing coding so that a predetermined buffer model, such as an underflow or an overflow of an internal buffer, does not fail, "seamless play" with which continuous reproduction is performed across streams is made possible. Each play item (excluding the play item at the beginning of the playlist) holds a connection condition (that is, whether or not seamless play is possible) with the immediately preceding play item.

Each time the user starts video recording, a mark as an entry mark is attached to the beginning of the play item (an entry mark in the playlist is also referred to as a "playlist mark (PLM)". One or more playlist marks exist in the playlist, each of which has a role of indicating a specific playback position of the clip AV stream. In one playlist, a serial number that is consecutive along the time axis is attached to each playlist mark. Furthermore, each playlist mark registered in the playlist holds the serial number of the play item to which such a mark has been attached and time stamp information indicating the playback position of the clip AV stream.

Then, one clip AV stream file is formed at the division of the recorded and captured streams. One clip AV stream is a unit necessitating playback for which continuous synchronization playback, that is, real-time playback, is guaranteed. As a result of this, a clip information file used to define a coding method of a movie stream, the size of a movie stream, playback time→address conversion, playback management information, a time map (when the recording medium is a DVD), and the like is created.

There is restrictions that a playlist mark is always placed at the beginning of the movie playlist (MoviePlayList). However, the position of a playlist mark can be moved along the time axis by a subsequent editing operation.

Each playlist mark becomes an entry position at which the user accesses a stream. Therefore, sections (and the section from the final play item mark to the end of the final playlist) divided between adjacent entry marks become minimum editing units that can be viewed by the user, that is, "chapters". As a result of arranging play items in the order of playback and arranging playlist marks in the desired order of playback, the order of the playback of each section of the clip AV stream registered in the playlist is defined.

In the product specification, a plurality of real playlists are collected and presented as a group of consecutive chapters to the user. For example, on the editing screen of a video camera, thumbnails (or thumbnail movies in which a playlist mark position is used as a play start point) of still image frames at each playlist mark position, which defines a chapter, are displayed in a list, so that an editing environment in units of chapters is provided to the user.

C. Data Layout on Optical Disc

In the data recording apparatus 1 according to this embodiment, data recording is performed on the optical disc 25 on the basis of a file system in compliance with UDF defined by OSTA. In UDF, by adopting a packet writing method, processing, such as addition and deletion of files on an optical disc, can be performed via a normal file system. UDF is a file system in which writing is possible from most of operating systems (OS) and also the written file is such that reproduction compatibility on the OS is realized without a special reading program, and content in the optical disc can be manipulated in the same manner as for a hard disk, a floppy disk, and a USB (Universal Serial Bus) flash memory. In the following, UDF 2.50 is assumed, but the data recording apparatus 1 according to this embodiment can also be applied to another file system.

Figure 5:
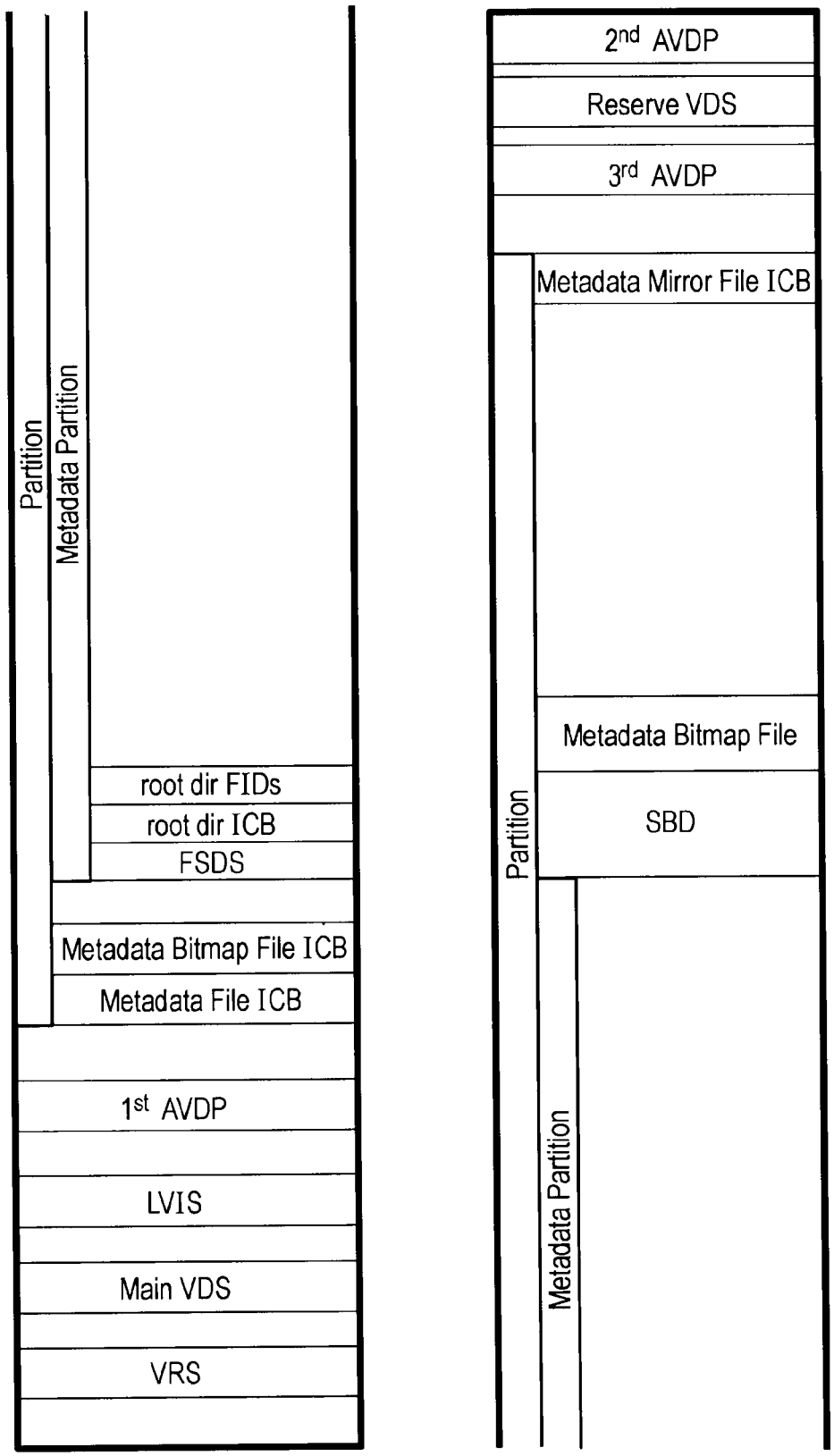
FIG. 5 shows a data layout immediately after physical formatting and file system recording processes are performed on an optical disc.

FIG. 5 shows a data layout immediately after physical formatting and file system recording processes are performed on an optical disc.

A VRS (Volume Recognition Sequence) recorded in the inner periphery of an optical disc is basic information used to recognize an optical disc, which is composed of one or more volume structure descriptors (Volume Structure Descriptors) in which information, such as a type regarding a volume structure, an identifier, and version information, is described.

A VDS (Volume Descriptor Sequence) includes basic information regarding a file system configuration in an optical disc, in which information regarding the content of the volume structure, such as the start position of a partition (Partition) and an LVIS (Logical Volume Integrity Sequence) and pointer information to a root directory, is described.

An LVIS is data containing information on the status of an optical disc, such as the size of the available area and the number of files of an optical disc.

An AVDP (Anchor Volume Descriptor Pointer) is data containing information on the starting position and the size of the VDS. In the UDF, the VDS is permitted to be freely placed within the volume structure in which packets have been written. On the other hand, as one of restrictions and essential conditions regarding data writing, it has been decided that an AVDP is recorded at least two locations among the three locations of the 256th logical sector (1st AVDP), the final logical sector number N in which recording ends, and the logical sector number 256 sectors before N (2nd AVDP and 3rd AVDP).

A partition (Partition) is a space for recording files of user data such as clip AV streams and file system information regarding the files, and the structure thereof is defined within the VDS.

A metadata partition (Metadata Partition) is a space for recording metadata that is file system information for managing the files of user data, which is provided in the partition, and the structure thereof is defined within the VDS.

A metadata file ICB (Metadata File ICB) is data containing data information on the starting position and the size of the metadata partition.

A metadata bitmap file ICB (Metadata Bitmap File ICB) is data containing information on the recording position and the size of a metadata bitmap file (MetadataBitmapFile) (to be described later).

Examples of meta-information recorded in the metadata partition include an FSDS, an ICB (Information Control Block) and an FID (File Identifier Descriptor) created for each directory and file.

An FSDS (File Set Descriptor Sequence) is data containing basic information for managing a group of files of user data and contains, for example, information regarding the recording position of the root directory.

An ICB is a descriptor for describing a directory or a file and contains information indicating the location where real data of a directory or a file is recorded. The FID is a descriptor containing information indicating the location where the ICB of a directory or a file is recorded. The real data of a directory is formed by a FID group, that is, FIDs, each of which indicates the position of each ICB in which the recording position of a child directory of the directory or a file directly below is described.

In the metadata partition immediately after the file system is initialized, as shown in FIG. 5, only the ICB and the FIDs (Root dir FIDs) regarding the root directory (Root dir ICB) exist. Thereafter, each time a directory is created in the partition or a file is recorded in the directory, an ICB and an FID regarding the new directory or file is additionally recorded in the metadata partition and also, an FID in which the recording position of the ICB of the new directory or file is described is additionally recorded in the FIDs of the parent directory.

An SBD (Space Bitmap Descriptor) is a file in which a used area in the partition contains data described in a bitmap format when, in particular, the recording medium is an overwritable type.

A metadata bitmap file (Metadata Bitmap File) is a file in which a used area in the metadata partition contains data described in a bitmap format when, in particular, the recording medium is an overwritable type.

A metadata mirror file ICB (Metadata Mirror File ICB), similarly to the above-described metadata file ICB, is data containing information on the starting position and the size of the metadata partition.

In the SBD immediately after the file system is initialized, the fact is described in a bitmap format that the area in which a metadata ICB, a metadata bitmap file ICB, a metadata partition, the SBD, a metadata bitmap file, and a metadata mirror file are recorded is a used area. Hereinafter, each time a file is recorded in the partition, the bitmap is updated.

In a similar manner, in the metadata bitmap file immediately after the file system is initialized, the fact is described in a bitmap format that the area in which FSDS, and the ICB and the FIDS of the root directory are recorded is a used area.

Hereinafter, as a file is recorded in the partition, the bitmap is updated each time a new ICB and FIDS are additionally recorded.

The VDS that is basic information of the volume structure can be freely placed outside the partition, but the recording position of the AVDP in which the recording location of the VDS is described is strictly decided. Therefore, access to the file data in the partition is possible in the order: AVDP→VDS→FSD (File Set Descriptor)→file entries (File Entries: FE) of the root directory→information control block (Information Control Block: ICB) of the root directory file identification information descriptor (File Identifier Descriptor: FID) in the root directory→ICB of file→data.

The directory structure having a video recording function, which is defined by the AVCHD standard, is as has already been described with reference to FIG. 13. As shown in FIG. 5, the directory structure shown in FIG. 13 does not exist in the data layout immediately after the file system is created.

When an AV stream file is to be recorded on a recording medium in compliance with the AVCHD standard, at least, a BDMV directory needs to be created directly below the root directory and also, directories "PLAYLIST", "CLIPINF", and "STREAM" need to be created in the BDMV directory in order to store playlists, clip information files, and clip AV stream files, respectively.

When the recording medium is to be removed from the data recording apparatus 10, in order to satisfy the AVCHD standard, sub-directories, such as JAR, JO, and AUXDATA, which are not necessary in the video recording function in the R mode, need to be created directly below the BDMV directory.

The new creation of a directory involves that an ICB containing information indicating the recording location of the real data of the metadata partition is created and recorded in the metadata partition, a FID group, that is, FIDS, each of which indicates the recording location of each ICB with regard to a child directory or a file directly below as the real data of the directory, is recorded in the metadata partition, and an FID indicating an ICB of a new directory is added to the FIDS of the parent directory. The new creation of a directory further involves a process for updating the metadata bitmap file as a result of recording the ICB and the FIDs of the directory in the metadata partition.

Figure 6:
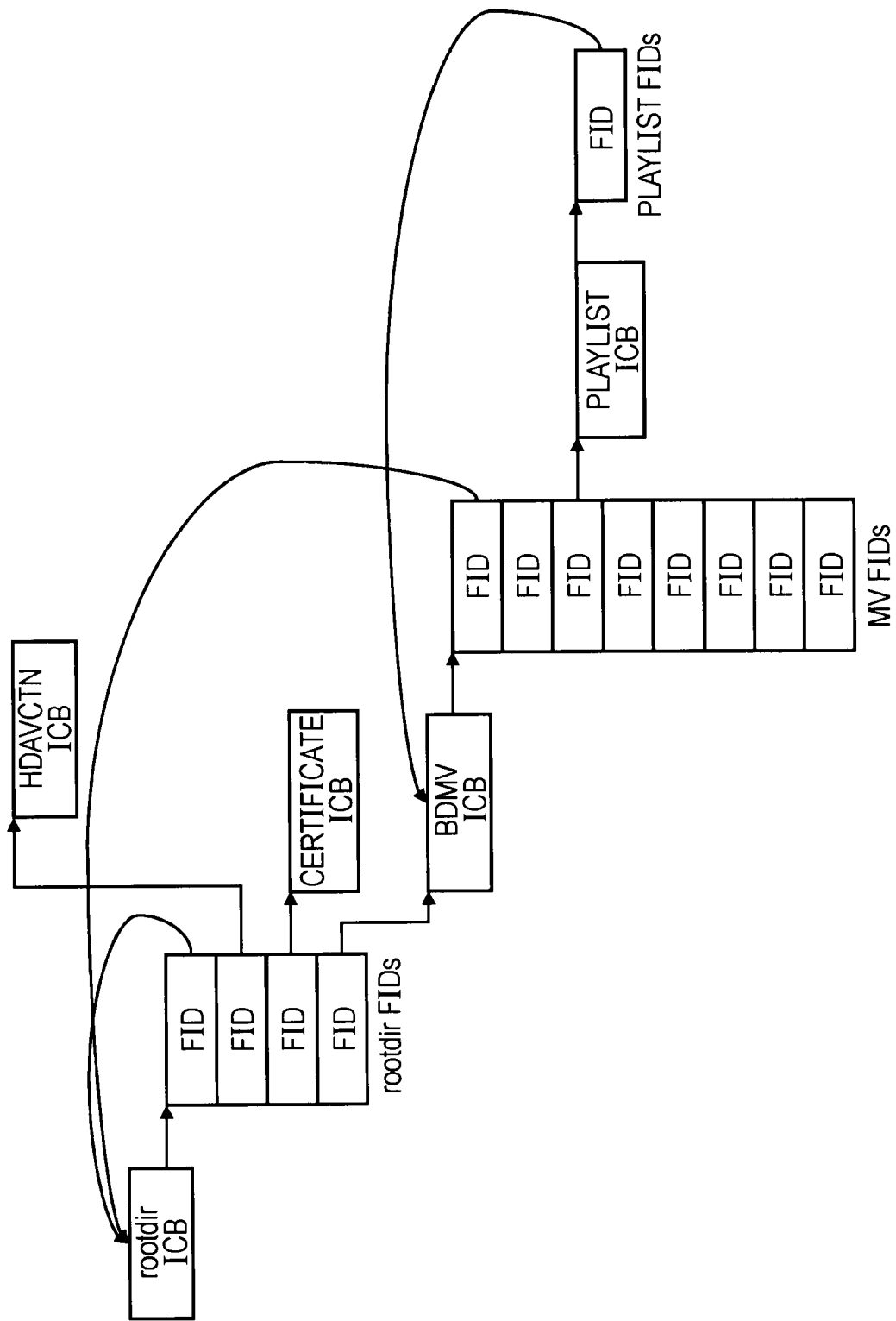
FIG. 6 shows a portion of the structure of metadata when a directory structure shown in FIG. 13 is created on a recording medium.

FIG. 6 shows a portion of the structure of metadata when the directory structure shown in FIG. 13 is created on a recording medium. The FID has been described as information indicating the location where the ICB of a directory or a file is recorded. As an exception, the FID at the beginning of the FIDs indicates the recording location of the ICB of the parent directory directly above.

The root directory ICB indicates the recording location of the root directory FIDs that are the entities thereof. The FID at the beginning of the root directory FIDs indicates the recording location of the root directory ICB and also, the other FIDs indicate the recording location of the ICB of each sub-directory of HDAVCTN, CERTIFICATE, and BDMV.

The ICB of the BDMV directory indicates the recording location of the BDMV FIDs, which are the entities thereof. The FID at the beginning of the BDMV FIDs indicates the recording location of the root directory ICB and also, the other FIDs indicate the recording location of the ICB of each sub-directory of STREAM, PLAYLIST, CLIPINF . . . .

The PLAYLIST ICB indicates the recording location of the PLAYLIST FIDs, which are the entities thereof. Before the AV stream file is recorded, the PLAYLIST FIDs have only the FID indicating the recording location of the ICB of the BDMV directory directly above. When an AV stream file is recorded in a form in which video recording/editing is possible, an FID indicating the recording position of the real data of the playlist file created as a result is recorded successively.

When a directory, which is defined by the AVCHD standard, is not created at the time of an initializing process and, for example, MV/STREAM, MV/CLIPINF, and MV/PLAYLIST are to be created at one of timings at which an AV stream file is recorded, problems arise in that a buffer for temporarily storing streams until the creation of these directories is completed becomes necessary, the real-time-use capability of the apparatus is deteriorated because a delay occurs due to a directory creation process, and the risk of an occurrence of an error due to a write process becomes high when these directories are created.

In order to quickly start recording an AV stream file, the creation of directories, such as AUXDATA, JO, JAR, and META, which are not used in the user data recording process, is further postponed. For example, when these directories are to be created in a process for removing a recording medium from the data recording apparatus 10, if the creation of the directory fails, an invalid state is reached in spite of the fact that the user data has been recorded successfully. Even if the creation of these directories succeeds, in the case that a write error occurs at the time of updating metadata, such as additional recording of FIDs of the parent directory, the user data that should have been recorded successfully cannot be reproduced.

Figure 7:
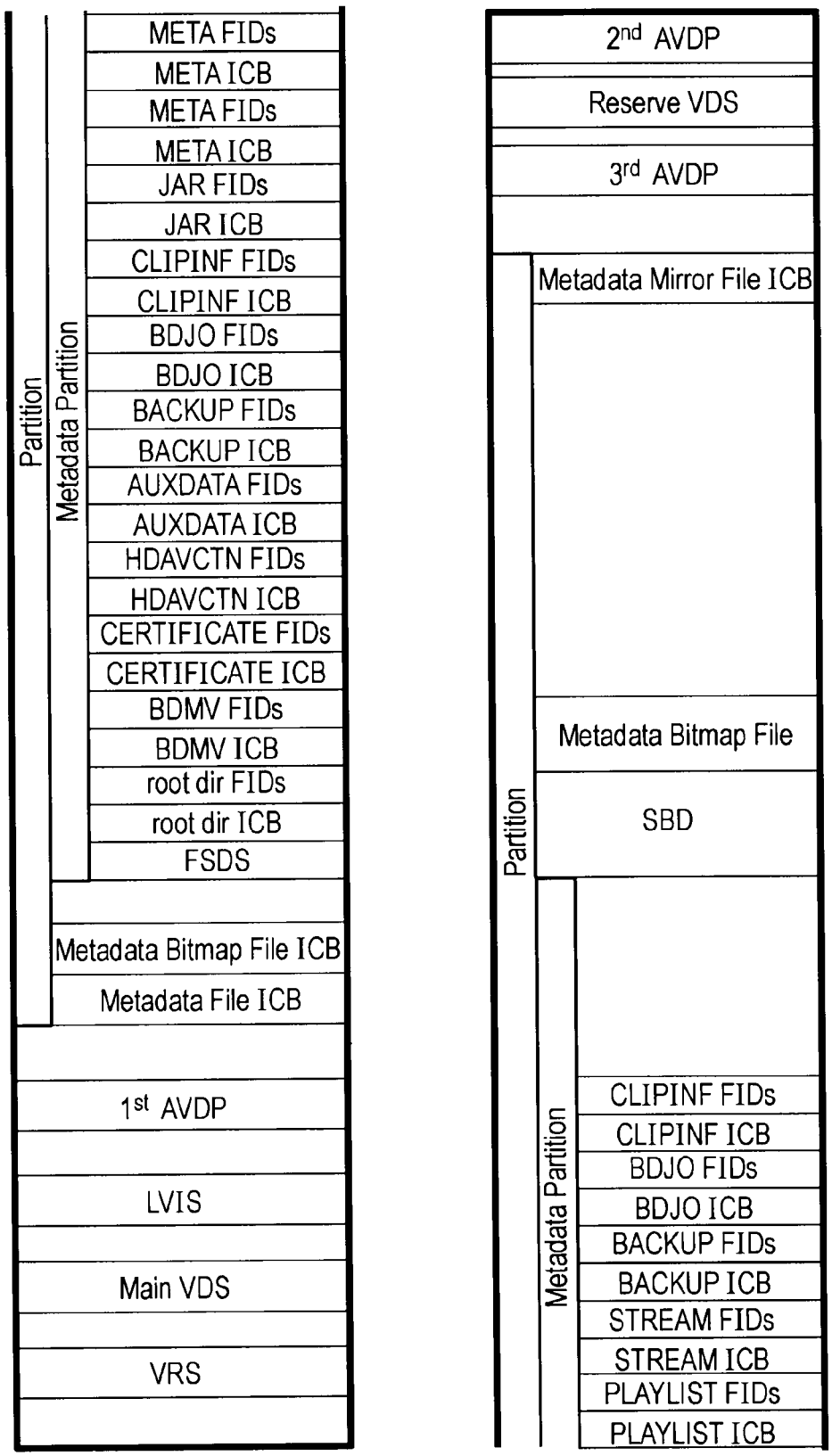
FIG. 7 shows a data layout in which a process is performed for creating a directory and a file, which are defined by the AVCHD standard at the time of initializing an optical disc.

Accordingly, in the data recording apparatus 10 according to this embodiment, in the process for initializing an optical disc, not only physical formatting and file system recording processes, but also a process for creating a directory and a file, which are defined by the AVCHD standard, in the data layout shown in FIG. 5 is performed. FIG. 7 shows an example of the structure of a data layout on an optical disc immediately after such an initializing process is performed. As can be seen from the figure, an ICB and FIDs, which are metadata regarding each directory shown in FIG. 13, have already been recorded in the metadata partition. Of course, the used area in the metadata partition shown in the figure is reflected in the data of the metadata bitmap file.

As shown in FIG. 7, when all the directories and files, which are defined by the AVCHD standard, have been created at the time when a process for initializing an optical disc is performed, since a directory creation process does not occur while the user data is being recorded, the real-time-use capability of the apparatus when video recording of an AV stream is improved.

Furthermore, since a directory creation process does not occur after initialization is performed, it is possible to reduce the risk that a write error occurs in a state in which the user data is recorded and also, it is possible to prevent the risk that the loss of the user data occurs due to the error.

Figure 8:
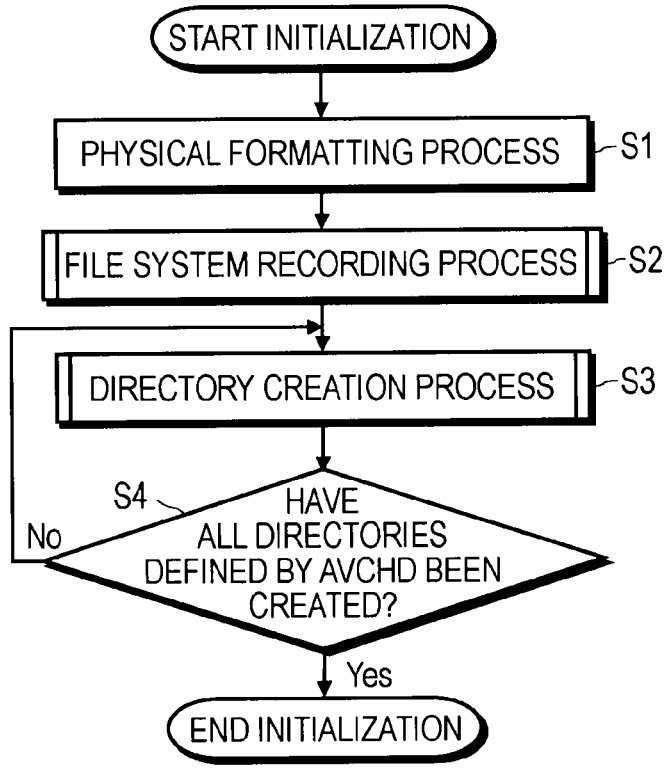
FIG. 8 is a flowchart showing a processing procedure for initializing an optical disc.

FIG. 8 shows, in a flowchart, a processing procedure for initializing an optical disc.

At first, a physical formatting process is performed (step S1), and then a file system recording process is performed (step S2). As a result, the recording surface of the optical disc is formed in a data layout shown in FIG. 5.

Next, a directory creation process is performed successively (step S3) with regard to each directory defined by AVCHD (step S4), thereby obtaining a data layout shown in FIG. 7.

Figure 9:
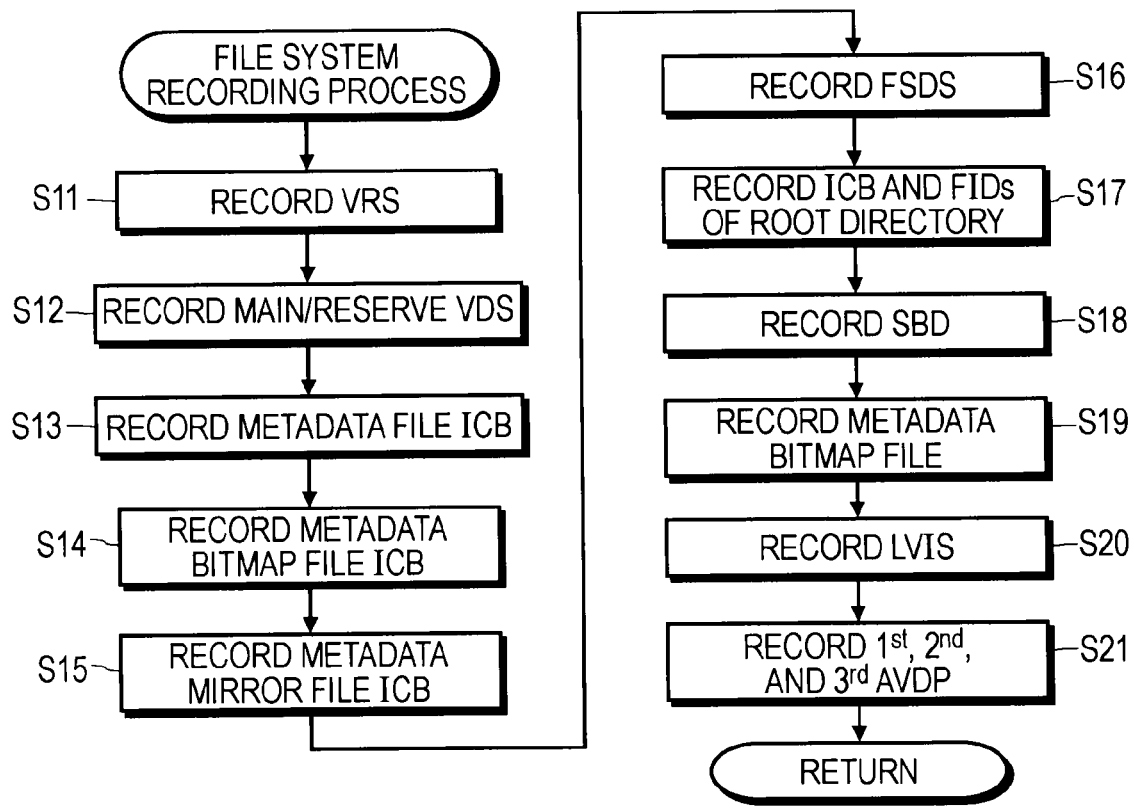
FIG. 9 is a flowchart showing the procedure of a file system recording process, which is performed in step S2 of the flowchart shown in FIG. 8.

FIG. 9 shows, in a flowchart, a procedure of the file system recording process performed in step S2.

At first, a VRS is recorded in the inner periphery of a disc (step S11), and then main and reserved VDS are recorded (step S12).

Next, a metadata file ICB in which the real data position of the metadata partition is described is recorded at the starting sector of the partition (step S13).

Next, the recording location of the real data of the metadata bitmap file is determined, and the metadata bitmap file ICB in which the location is described is recorded in the partition (step S14).

Furthermore, the metadata mirror file ICB, which has the same content as that of the metadata file ICB, is recorded in the partition (step S15).

Next, an FSDS, a root directory ICB, and root directory FIDs are recorded in the metadata partition, in which the recording location is indicated by the metadata file ICB (steps S16 and S17).

Next, an SBD is recorded in the partition (step S18). The SBD is composed of data such that the fact is described in a bitmap format that the recording areas of a metadata file ICB, a metadata bitmap file ICB, a metadata partition, a metadata bitmap file, a metadata mirror file ICB, and the SBD have been used in the partition.

Next, the metadata bitmap file is recorded at the recording location indicated by the metadata bitmap file ICB (step S19). The metadata bitmap file is composed of data such that the recording area of the FSDS, the root directory ICB, and the root directory FIDs has been used is described in a bitmap format in the metadata partition.

At this point, since the size of the available area of the optical disc and the number of files recorded in the partition are decided, the LVIS is recorded in the area outside the partition (step S20).

Then, three AVDP are recorded at the respective locations decided by UDF (step S21), and this processing routine is completed.

Figure 10:
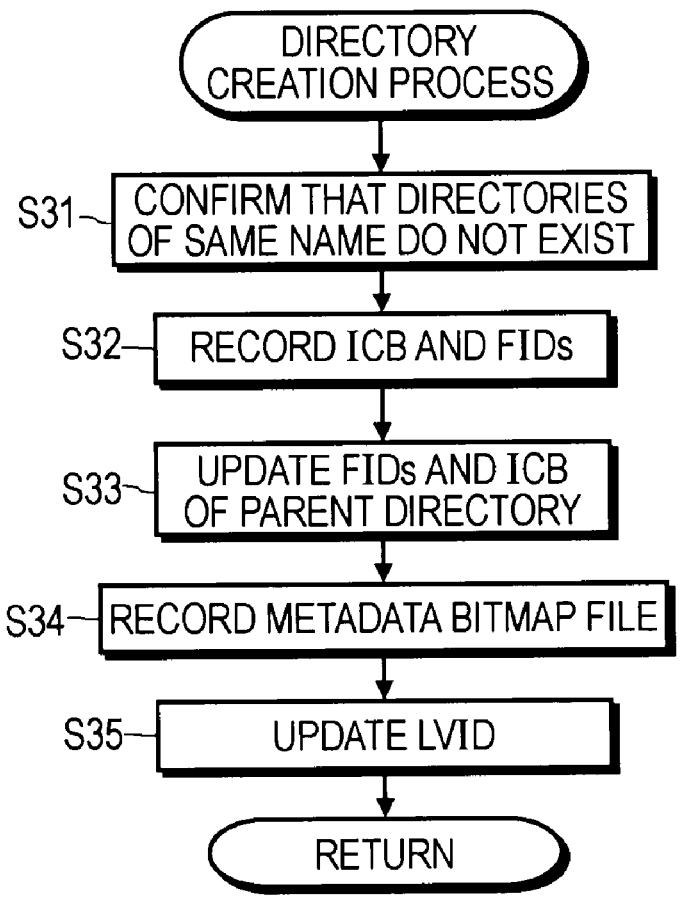
FIG. 10 is a flowchart showing the procedure of a directory creation process, which is performed in step S3 of the flowchart shown in FIG. 8.

FIG. 10 shows, in a flowchart, the procedure of the directory creation process performed in step S3 of the flowchart shown in FIG. 8.

At first, it is confirmed that a directory having the same name as that of the directory to be created now does not exist in the partition (step S31).

Then, the ICB containing information regarding the recording location of the real data of the directory to be created, and an FID group, that is, FIDs, each of which indicates the position of each ICB of a directory directly below as the real data of the directory and a file, are recorded in the metadata partition (step S32).

Next, as a result of creating a new directory, the FIDs and the ICB of the directory serving as a parent in the directory structure are updated (step S33). More specifically, the FID indicating the ICB of the new directory is added to the FIDs of the parent directory. The ICB contains the file size information. Since the file size of the parent directory changes as FIDs are added, the ICB of the parent directory is also updated.

Next, the metadata bitmap file is updated so that the area where the ICB and the FIDs of the new directory are recorded in the metadata partition is placed in a used state (step S34).

Then, the content of the LVID (Logical Volume Integrity Descriptor) is updated (step S35), and this processing routine is completed.

Here, the LVID is one of descriptors constituting the LVIS and contains, for example, information for managing the used size of the partition, the available size of the partition, the total number of files, the total number of directories, and the like. The updating of the LVID in step S35 means processing for updating the varying value according to a directory that is newly created. More specifically, the updating is a process for updating the values of SizeTable that is information for managing the available size of the partition, FreeSpaceTable that is information for managing the available size of the partition, Number of Directories that is information for managing the total number of directories, and UniequeID that is information for assigning a unique number for each ICB.

By performing the directory creation process shown in FIG. 10 on the optical disc immediately after the file system creation process is performed, as shown in FIG. 7, it is possible to provide all the directories and files that are defined by the AVCHD standard in the partition. Therefore, since a directory creation process does not occur while user data is being recorded, the real-time-use capability of the apparatus when video recording of an AV stream is performed is improved. Furthermore, since a directory creation process does not occur after initialization is performed, it is possible to reduce the risk that a write error occurs in a state in which user data is recorded, and it is possible to prevent the risk of the occurrence of the loss of user data due to the error.

However, in spite of the fact that all directories and files that should be created at the time of initializing an optical disc are known in advance, if, as shown in FIG. 8, individual directory creation processes (refer to FIG. 10) are repeatedly performed with regard to each directory, a process for updating a metadata bitmap file and a process for updating the ICB and the FIDs of the parent directory as a consequence of recording the ICB and the FIDs of the directory are repeatedly performed, which is not efficient.

Accordingly, as a modification of the process for initializing an optical disc shown in FIGS. 8 to 10, in the file system recording process after physical formatting is performed, a method of comprehensively performing a process for recording an SBD and a metadata bitmap file and a process for updating the ICB and the FIDs of the parent directory with consideration of all the directories and files defined by the AVCHD standard is considered. In such a case, identical processing needs not to be repeated for each directory defined by the AVCHD standard, which is efficient.

Figure 11:
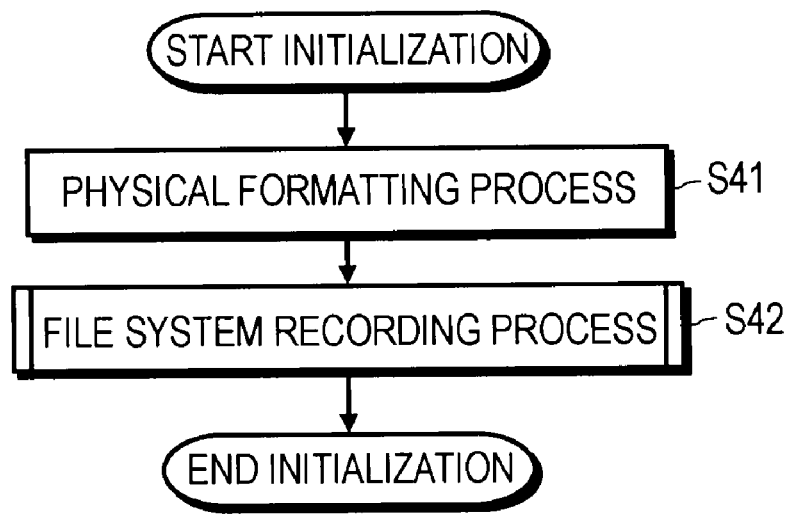
FIG. 11 is a flowchart showing a processing procedure for initializing an optical disc.

FIG. 11 shows, in a flowchart, a processing procedure for initializing an optical disc.

At first, a physical formatting process is performed (step S41), and then a file system recording process is performed (step S42). In the file system recording process, since a process for creating all directories and files defined by AVCHD is also performed, the data layout shown in FIG. 7 can be obtained.

Figure 12:
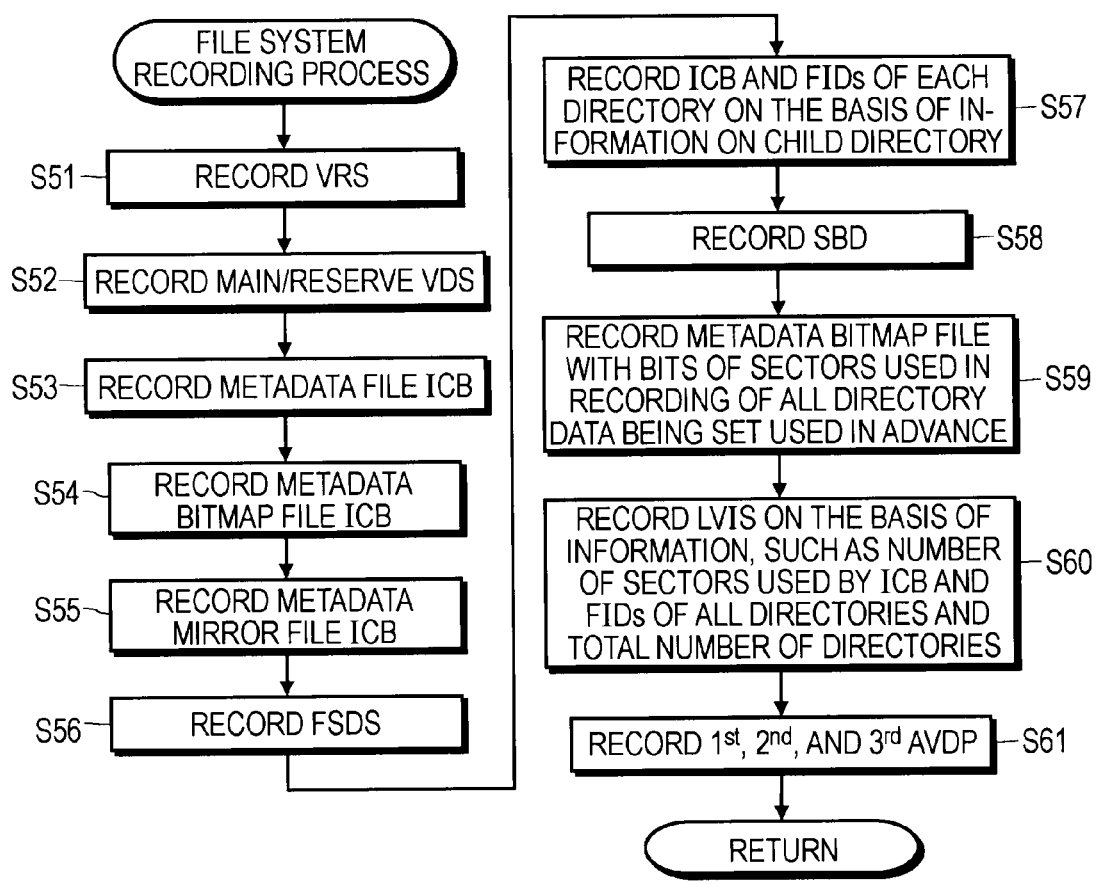
FIG. 12 is a flowchart showing the procedure of a file system recording process, which is performed in step S42 of the flowchart shown in FIG. 11.

FIG. 12 shows, in a flowchart, the procedure of the file system recording process performed in step S42.

At first, a VRS is recorded in the inner periphery of a disc (step S51), and then main and reserve VDS are recorded (step S52).

Next, a metadata file ICB in which the real data position of the metadata partition is described is recorded in the starting sector of the partition (step S53).

Next, the recording location of the real data of the metadata bitmap file is determined, and the metadata bitmap file ICB in which the location is described is recorded in the partition (step S54).

Furthermore, the metadata mirror file ICB having the same content as that of the metadata file ICB is recorded in the partition (step S55).

Next, an FSDS is recorded in the metadata partition in which the recording location is indicated by the metadata file ICB (step S56).

Next, on the basis of the information on the child directory, the ICB and the FIDs regarding each directory shown in FIG. 13 are recorded in the metadata partition (step S57).

Next, an SBD is recorded in the partition (step S58). The SBD is composed of data in which the fact is described in a bitmap format that the recording area of a metadata file ICB, a metadata bitmap file ICB, a metadata partition, a metadata bitmap file, a metadata mirror file ICB, and the SBD, has been used in the partition. Unlike the processing procedure shown in FIG. 8, only one updating process of the SBD needs to be performed.

Next, with the bit positions corresponding to the sectors used as a result of recording the ICB and the FIDs with regard to all the directories in the metadata partition being set to a used state, the metadata bitmap file is recorded (step S59). Unlike the processing procedure shown in FIG. 8, only one process for updating the metadata bitmap file needs to be performed.

Next, an LVIS is recorded in an area outside the partition on the basis of the information, such as the number of sectors used as a result of recording the ICB and the FIDs of all the directories shown in FIG. 13, and the total number of directories in the metadata partition (step S60).

Then, three AVDPs are recorded at each location decided by UDF (step S61), and this processing routine is completed.

The initialization of a file system shown in accordance with the processing procedure shown in FIG. 12 is equivalent to that the state of the file system after processing in accordance with the flowcharts shown in FIGS. 8 to 10 is performed is recorded as the initial data of the file system on a disc.

In a commonly used file system such as UDF, when creating a directory, the data of such a directory needs to be recorded and also, the management information for the entire medium, such as the total number of directories of the recording medium and the available area/available capacity thereof, needs to be updated. According to the procedure of the optical-disc initialization process shown in FIGS. 11 and 12, since directory data that is necessary at the time of initializing a recording medium is created, it is possible to construct file system information with consideration of the total number of directories of the medium and the available area/the available size thereof. This is efficient when compared with the case in which directory data is individually created after the initializing process is once completed.

According to such an initialization procedure, necessary directory data is created in coincidence with the initialization of the recording medium. Therefore, by constructing file system information with consideration of the total number of directories of the medium and the available area/the available size thereof, it is possible to suppress disc access that occurs in the usual directory/file creation process, thereby leading to an improved processing speed and improved robustness of media.

According to such an initialization procedure, directories are created collectively when a recording medium is initialized. When directory information is recorded in a commonly used file system, these pieces of information are often arranged at nearby positions. Therefore, when a recording medium is loaded into a data recording apparatus or a playback apparatus having a caching mechanism, directory information is collectively cached, and there is a secondary effect of an increased probability of a cache hit occurring.

INDUSTRIAL APPLICABILITY

Up to this point, the present invention has been described in detail while referring to the specific embodiment. However, it is obvious that a person skilled in the art can modify or substitute the embodiment within the spirit and scope of the present invention.

In this specification, by assuming a file system in compliance with UDF 2.50 defined by OSTA, a description has been given of an embodiment in which initialization of an optical disc and a directory creation process in accordance with the AVCHD standard are performed. However, the gist of the present invention is not limited to the embodiment, and of course, the present invention can be applied to another file system.

In summary, the present invention has been disclosed in the form of examples, and should not be construed as being limited thereto. In order to determine the gist of the present invention, the claims should be taken into consideration.

The invention claimed is:

1. A recording medium initialization apparatus for initializing a recording medium, comprising:
    an initializing unit to initialize a storage area of the recording medium; and
    a recording unit to record a user data file and a management information file of the user data file based on a predetermined standard,
    wherein the initializing unit includes
        a physical formatting unit configured to perform physical formatting on the recording medium,
        a file system creation unit configured to create a file system on the basis of a predetermined file system format in the storage area of the recording medium after physical formatting is performed, the file system having a data layout including a partition for recording user data files, a metadata partition included in the partition for recording metadata management information of the user data files, and a logical volume integrity sequence (LVIS) located outside the partition and identifying the number of files and available area on the recording medium, and
        a directory structure creation unit configured to
            create, based on the predetermined standard and in the storing area where the file system is created, a directory structure to record both the user data file and the management information file of the user data file, and
            record, in the metadata partition, an information control block (ICB) containing information indicating the recording location where real data is recorded with regard to each directory contained in the directory structure defined by the predetermined standard, wherein
        the directory structure creation unit records metadata formed of a collection of file identification information descriptors (FIDs) which contain information indicating the recording location of the information control block of a directory stored directly below one of the each directory as the real data or a file, and
        the LVIS is recorded based on the recording of ICBs and FIDs of all the directories in the metadata partition.

2. The data recording apparatus according to claim 1, wherein
    the predetermined standard is an audio-visual standard,
    the partition provides a recording space of a file in a recording area of the recording medium and creates a root directory in the partition, and
    the directory structure creation unit creates an BDMV directory directly below the root directory in the partition and creates, directly below the BDMV directory, a STREAM directory for storing stream files, and a PLAYLIST directory and a CLIPINF directory for storing playlists and clip information files serving as a management information file of a clip AV stream file, respectively, and each of the directories of AUXDATA, BDJO, JAR, and META.

3. The data recording apparatus according to claim 1, wherein the predetermined file system format is a UDF (Universal Disk Format) established by OSTA (Optical Storage Technology Association).

4. The data recording apparatus according to claim 3, wherein the directory structure creation unit records, under the root directory of the partition, the ICB and the FIDs with regard to each directory contained in a directory structure defined by the predetermined standard with consideration of the information of child directories lower in the hierarchy of the directory structure, after the directory structure is created by the directory structure creation unit, the file system creation unit records, in the partition, each file for managing a used area in the partition and a used area in the metadata partition, and the LVIS is further recorded based on the total number of recorded directories.

5. A recording medium method for initializing a recording medium, comprising:

initializing a storage area of the recording medium;

recording a user data file and a management information file of the user data file based on a predetermined standard, wherein the initializing includes performing physical formatting on the recording medium, creating a file system on the basis of a predetermined file system format in the storage area of the recording medium after physical formatting is performed, the file system having a data layout including a partition for recording user data files and a metadata partition included in the partition for recording metadata management information of the user data files, and a logical volume integrity sequence (LVIS) located outside the partition and identifying the number of files and available area on the recording medium, and creating, based on the predetermined standard and in the storing area where the file system is created, a directory structure to record both the user data file and the management information file of the user data file;

recording, in the metadata partition created in the file system creating step, an information control block (ICB) containing information indicating the recording location where real data is recorded with regard to each directory contained in the directory structure defined by the predetermined standard; and recording metadata formed of a collection of file identification information descriptors (FIDs) which contain information indicating the recording location of the information control block of a directory stored directly below one of the each directory as the real data or a file, wherein the LVIS is recorded based on the recording of ICBs and FIDs of all the directories in the metadata partition.

6. The data recording method according to claim 5, wherein the predetermined standard is an audio-visual standard, the file system creating step provides a partition as a recording space of a file in a recording area of the recording medium and creates a root directory in the partition, and the directory structure creating step creates an BDMV directory directly below the root directory in the partition and creates, directly below the BDMV directory, a STREAM directory for storing stream files, and a PLAYLIST directory and a CLIPINF directory for storing playlists and clip information files serving as a management information file of a clip AV stream file, respectively, and each of the directories of AUXDATA, BDJO, JAR, and META.

7. The data recording method according to claim 5, wherein the predetermined file system format is a UDF (Universal Disk Format) established by OSTA (Optical Storage Technology Association).

8. The data recording method according to claim 7, wherein the directory structure creating step records, under the root directory of the partition created in the file system creating step, the ICB and the FIDs with regard to each directory contained in a directory structure defined by the predetermined standard with consideration of the information of child directories lower in the hierarchy of the directory structure, after the directory structure is created in the directory structure creating step, each file for managing a used area in the partition and a used area in the metadata partition is recorded in the partition, and the LVIS is further recorded based on the total number of recorded directories.

9. A non-transitory computer-readable medium storing computer readable instructions thereon that when executed by a recording medium initialization apparatus cause the recording medium initialization apparatus to perform a method comprising:

initializing a storage area of the recording medium;

recording a user data file and a management information file of the user data file based on a predetermined coding standard, wherein the initializing includes performing physical formatting on the recording medium, creating a file system on the basis of a predetermined file system format in the storage area of the recording medium after physical formatting is performed, the file system having a data layout including a partition for recording user data files and a metadata partition included in the partition for recording metadata management information of the user data files, and a logical volume integrity sequence (LVIS) located outside the partition and identifying the number of files and available area on the recording medium, and creating, based on the predetermined standard and in the storing area where the file system is created, a directory structure to record both the user data file and the management information file of the user data file;

recording, in the metadata partition created in the file system creating step, an information control block (ICB) containing information indicating the recording location where real data is recorded with regard to each directory contained in the directory structure defined by the predetermined standard; and recording metadata formed of a collection of file identification information descriptors (FIDs) which contain information indicating the recording location of the information control block of a directory stored directly below one of the each directory as the real data or a file, wherein the LVIS is recorded based on the recording of ICBs and FIDs of all the directories in the metadata partition.

* * * * *